(12) United States Patent
Hiraoka et al.

(10) Patent No.: US 8,502,889 B2
(45) Date of Patent: Aug. 6, 2013

(54) SOLID-STATE IMAGE CAPTURING DEVICE, AND IMAGE CAPTURING APPARATUS

(75) Inventors: Toshiaki Hiraoka, Osaka (JP); Kenichi Shimomura, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/400,899

(22) Filed: Feb. 21, 2012

(65) Prior Publication Data

US 2012/0147209 A1 Jun. 14, 2012

Related U.S. Application Data

(63) Continuation of application No. PCT/JP2010/004873, filed on Aug. 3, 2010.

(30) Foreign Application Priority Data

Aug. 27, 2009 (JP) ................................. 2009-197457

(51) Int. Cl.
*H04N 5/76* (2006.01)

(52) U.S. Cl.
USPC .................................. 348/231.6; 348/231.99

(58) Field of Classification Search
USPC ............................ 348/222.1, 231.99, 231.6
See application file for complete search history.

(56) References Cited

U.S. PATENT DOCUMENTS

| 5,819,035 | A | 10/1998 | Devaney et al. |
|---|---|---|---|
| 7,116,360 | B2 | 10/2006 | Shiohara |
| 2007/0223824 | A1 | 9/2007 | Kato et al. |
| 2008/0218619 | A1* | 9/2008 | Egawa ........................... 348/296 |
| 2009/0027517 | A1* | 1/2009 | Jerdev ......................... 348/231.6 |
| 2009/0027727 | A1* | 1/2009 | Ovsiannikov ................ 358/1.17 |
| 2009/0051801 | A1 | 2/2009 | Mishina et al. |
| 2009/0244307 | A1 | 10/2009 | Nagaishi et al. |
| 2010/0259631 | A1 | 10/2010 | Sugita |

FOREIGN PATENT DOCUMENTS

| JP | 9-200759 | 7/1997 |
|---|---|---|
| JP | 2003-234967 | 8/2003 |
| JP | 2003-259151 | 9/2003 |
| JP | 2005-347932 | 12/2005 |
| JP | 2007-104525 | 4/2007 |
| JP | 2007-228515 | 9/2007 |
| JP | 2009-10822 | 1/2009 |
| JP | 2009-49740 | 3/2009 |
| JP | 2009-117997 | 5/2009 |
| KR | 638012 B1 * | 10/2006 |

OTHER PUBLICATIONS

International Search Report of PCT Application No. PCT/JP2010/004873, dated Aug. 31, 2010.

* cited by examiner

*Primary Examiner* — Tuan Ho
*Assistant Examiner* — Zhenzhen Wu
(74) *Attorney, Agent, or Firm* — Panasonic Patent Center

(57) ABSTRACT

A solid-state image capturing device includes: a pixel array including a plurality of two-dimensionally arrayed pixels; a row scanning circuit that performs row scanning to sequentially select a row; a column ADC circuit that simultaneously converts analog pixel signals output from the plurality of pixels belonging to a row selected by the row scanning circuit into pieces of digital pixel data; a column digital memory that stores pixel data of one row therein; and a one-line compression circuit that sequentially performs compression coding to pixel data output from the column digital memory. In the solid-state image capturing device, when performing the compression coding to the pixel data, the one-line compression circuit refers to pixel data belonging to a row identical to that of the pixel data in question while not referring to pixel data belonging to a row different from that of the pixel data in question.

12 Claims, 29 Drawing Sheets

| Code name | Meaning | Setting value |
|---|---|---|
| SOF | Frame starting code | 24'hFFFF01 |
| EOF | Frame ending code | 24'hFFFF02 |
| SOL | line starting code | 24'hFFFF04 |
| EOL | line ending code | 24'hFFFF08 |

FIG. 10

| SOF | R2 | R4 | ······· | R4094 | R4096 | EOL |
|---|---|---|---|---|---|---|
| SOL | G2 | G4 | ······· | G4094 | G4096 | EOL |
| SOL | R2 | R4 | ······· | R4094 | R4096 | EOL |
| SOL | G2 | G4 | ······· | G4094 | G4096 | EOL |
| ⋮ | ⋮ | ⋮ | ⋱ | ⋮ | ⋮ | ⋮ |
| SOL | R2 | R4 | ······· | R4094 | R4096 | EOL |
| SOL | G2 | G4 | ······· | G4094 | G4096 | EOF |

FIG. 21

| Comparative signal | Coded code | Signal A8 | Signal A7 | Signal A6 | Signal A5 | Signal A4 | Signal A3 | Signal A2 | Signal A1 |
|---|---|---|---|---|---|---|---|---|---|
| 4'b0000 | 1'b0 | – | – | – | – | – | – | – | 1'b0 |
| 4'b0001 | 3'b100 | – | – | – | – | – | 1'b1 | 1'b0 | 1'b0 |
| 4'b0010 | 3'b101 | – | – | – | – | – | 1'b1 | 1'b0 | 1'b1 |
| 4'b0011 | 5'b11000 | – | – | – | 1'b1 | 1'b1 | 1'b0 | 1'b0 | 1'b0 |
| 4'b0100 | 5'b11001 | – | – | – | 1'b1 | 1'b1 | 1'b0 | 1'b0 | 1'b1 |
| 4'b0101 | 5'b11010 | – | – | – | 1'b1 | 1'b1 | 1'b0 | 1'b1 | 1'b0 |
| 4'b0110 | 5'b11011 | – | – | – | 1'b1 | 1'b1 | 1'b0 | 1'b1 | 1'b1 |
| 4'b0111 | 5'b11100 | – | – | – | 1'b1 | 1'b1 | 1'b1 | 1'b0 | 1'b0 |
| 4'b1000 | 5'b11101 | – | – | – | 1'b1 | 1'b1 | 1'b1 | 1'b0 | 1'b1 |
| 4'b1001 | 6'b111100 | – | – | 1'b1 | 1'b1 | 1'b1 | 1'b1 | 1'b0 | 1'b0 |
| 4'b1010 | 6'b111101 | – | – | 1'b1 | 1'b1 | 1'b1 | 1'b1 | 1'b0 | 1'b1 |
| 4'b1011 | 7'b1111100 | – | 1'b1 | 1'b1 | 1'b1 | 1'b1 | 1'b1 | 1'b0 | 1'b0 |
| 4'b1100 | 7'b1111101 | – | 1'b1 | 1'b1 | 1'b1 | 1'b1 | 1'b1 | 1'b0 | 1'b1 |
| 4'b1101 | 8'b11111100 | 1'b1 | 1'b1 | 1'b1 | 1'b1 | 1'b1 | 1'b1 | 1'b0 | 1'b0 |
| 4'b1110 | 8'b11111101 | 1'b1 | 1'b1 | 1'b1 | 1'b1 | 1'b1 | 1'b1 | 1'b0 | 1'b1 |
| 4'b1111 | 8'b11111110 | 1'b1 | 1'b1 | 1'b1 | 1'b1 | 1'b1 | 1'b1 | 1'b1 | 1'b0 |
| none | 8'b11111111 | – | – | – | – | – | – | – | – |

SOLID-STATE IMAGE CAPTURING DEVICE, AND IMAGE CAPTURING APPARATUS

BACKGROUND

1. Technical Field

The present invention relates to a solid-state image capturing device and an image capturing apparatus, for performing one-line compression.

2. Background Art

The number of pixels is already exceeds 10 millions in a digital still camera while exceeding 20 millions in a digital single-lens reflex camera, and this trend is expected to continue. There is also an increasing demand to enhance a frame rate in capturing a moving image. For the two reasons described above, various techniques are studied to meet a demand for significantly high speed data output in a solid-state image capturing device that is of a key part of a camera system.

A physical method for dealing with speed enhancement of data transfer includes only extension of an output terminal and speed enhancement of a data transfer frequency. However, unfortunately a circuit scale of the solid-state image capturing device is enlarged in the method for increasing the number of output terminals. In the method for increasing the data transfer frequency, problems of an electromagnetic noise and timing skew during signal passing between semiconductor elements are generated because of an increased operating frequency of a circuit. Additionally, power consumption is increased in both the methods, and therefore a problem of degradation of an image capturing characteristic is generated in the solid-state image capturing device.

Data compression also exists in the method for effectively achieving the speed enhancement of the data transfer, not depending on the physical countermeasure. A method in which a two-dimensional discrete cosine transform circuit and a one-dimensional Huffman coding circuit are mounted has been proposed in the solid-state image capturing device (for example, see Unexamined Japanese Patent Publication No. 2003-234967).

Hereinafter, a solid-state image capturing device of the background art will be described with reference to the drawing.

FIG. 30 is a block diagram illustrating a configuration of the image capturing apparatus of the background art.

Referring to FIG. 30, after performing a read scan for each row of a pixel array configured by 512 by 512, analog pixel signals read from a pixel array are stored in analog buffer 910c, A/D conversion is performed by A/D conversion circuit 911, two-dimensional discrete cosine transform (hereinafter referred to as a DCT) is performed in each four blocks by compression circuit 912 with 4×4 pixels as one block, and one-dimensional Huffman coding is performed to a calculation result of the two-dimensional DCT, thereby performing the compression of the pixel data.

CITATION LIST

Patent Literature

PTL 1: Unexamined Japanese Patent Publication No. 2003-234967 (FIG. 1)

SUMMARY

However, in order to perform the compression to kth (k is a natural number) row to (k+3)-th row of the pixel array by the method described in Unexamined Japanese Patent Publication No. 2003-234967 with the 4×4 pixels as one block, it is necessary that the pieces of pixel data from kth row to (k+3)-th row can simultaneously be referred to from the compression circuit.

In this case, a configuration in which digital data after the A/D conversion is stored in a memory is most open and efficient. That is, a digital memory in which the pieces of pixel data of at least four rows are stored is necessary only from the viewpoint of a specification of the compression circuit.

However, in order to calculate a memory capacity actually necessary for the solid-state image capturing device including a compression function in FIG. 30, it is necessary to consider not only the specification of the compression circuit but also a read sequence of the pixel array.

A row transfer method for simultaneously reading pixels of one row in each one horizontal scanning cycle is considered as the read sequence of the pixel array.

At this point, in the case that four horizontal scanning cycles are necessary for compression processing and output of pieces of data of the kth row to the (k+3)-th row after four horizontal scanning cycles are necessary to read the pixels of the kth row to the (k+3)-th row, it is necessary to provide additional digital memory in which the pieces of data read from the pixel array therebetween (pixels of the (k+4)-th row to the (k+7)-th row) are stored. Therefore, unfortunately the digital memory for four rows is additionally necessary, and the digital memory for the sum of eight rows is necessary.

Only the digital memory for one row is added when the compression processing and the output can be performed to the pixels of the kth row to the (k+3)-th row within a read cycle of the pixel array of the (k+4)-th row (within one horizontal scanning cycle). However, it is necessary to provide the digital memory for five rows. In this case, because the compression is performed by repeatedly accessing to the pieces of memory data of the four rows of the kth row to the (k+3)-th row in one horizontal scanning cycle of the (k+4)-th row, it is necessary to pay attention to the increased operating frequency of the circuit and the increased power consumption.

Because the number of pixels is as relatively small as the 512×512 pixels in the solid-state image capturing device of the background art, it is only necessary to ensure the memory for 512 pixels as one row. However, as described above, recently the number of pixels is already exceeds 10 millions even in the compact camera. For example, in the case of the image capturing apparatus including the number of pixels of about 12 millions (3072 by 4096) that is studied by the inventors, it is necessary to ensure the memory capacity for the 4096 pixels as one row, namely, eight times that of the background art, and the above problem is further grown.

An estimated amount of only the memory for the pre-compression data is described above.

On the other hand, in the solid-state image capturing device including a column A/D conversion circuit that has no compression function, the A/D conversion is simultaneously performed to the pieces of analog pixel data obtained by read scanning of each row, and the pieces of digital pixel data of one row are output after stored in a buffer memory. Therefore, it is necessary to provide the memory in which the pieces of pixel data of one row are stored.

Accordingly, it is found that the memory capacity in the case that the two-dimensional compression is performed is five times as much as the case that the two-dimensional compression is not performed.

In the solid-state image capturing device of the background art, the need for the memory also arises in the compression processing in addition to the digital memory.

In a configuration in which the pixels corresponding to a block to be compressed can sequentially be output while point sequential scanning is adopted as pixel access, the digital memory for the fifth row to the eighth row is also eliminated. However, because it is necessary to select the pixel using information on the row and the column, it is necessary that at least one additional transistor that selects the read pixel be provided in each pixel. It is necessary to allocate part of an effective area of the pixel to the transistor and a control signal line of the transistor, which results in a problem in that pixel sensitivity is degraded.

In this case, there is newly generated a problem that it is necessary to use not the row A/D conversion circuit that concurrently performs the A/D conversion to the pixels of one row in one horizontal scanning cycle, but an old-type A/D conversion in which the A/D conversion is performed to one pixel in each pixel cycle. Because a signal band of the A/D conversion is enhanced in the old-type A/D conversion method, an SNR tends to be degraded compared with the row A/D conversion method.

That is, in the method for simultaneously compressing the plural rows, which is disclosed in Unexamined Japanese Patent Publication No. 2003-234967, unfortunately the degradation of cost performance by the increased memory and the degradation of the power consumption by high-speed memory access cannot be avoided, and particularly the degradation of the power consumption causes the degradation of the image capturing characteristic due to heat.

From the foregoing description of the problems, an object of the invention is to provide an image capturing apparatus and a solid-state image capturing device, in which the cost performance is improved, the power consumption is reduced, and the image capturing characteristic is not degraded.

In order to solve the problems, according to an aspect of the invention, a solid-state image capturing device includes: an image capturing region including plural two-dimensionally arrayed pixels; a row scanning unit that performs row scanning to sequentially select a row; an A/D conversion unit that simultaneously converts analog pixel signals output from the plural pixels belonging to a row selected by the row scanning unit into pieces of digital pixel data; a row memory that stores pixel data of one row, to which the A/D conversion has been performed, therein; and a compression unit that sequentially performs compression coding to pixel data output from the row memory, wherein, when performing the compression coding to the pixel data, the compression unit refers to pixel data belonging to a row identical to that of the pixel data in question while not referring to pixel data belonging to a row different from that of the pixel data in question.

According to the configuration, the compression coding is performed to the pixel data belonging to the row identical to that of the pixel data in question without referring to the pixel data of the different row, so that only the pixel data amount of one line is enough for the memory capacity necessary for the compression processing. Therefore, the memory capacity is decreased, the cost performance can be improved, and the power consumption and the heat generation amount, which are caused by the memory access, can be reduced. Additionally, the degradation of the image capturing characteristic can be reduced.

The solid-state image capturing device may further include a FIFO (First In First Out) unit that stores coded pixel data from the compression unit therein by a FIFO method and intermittently outputs the coded pixel data, wherein the FIFO unit inputs the coded pixel data of one row from the compression unit during a first cycle in a row selection cycle in which the row scanning unit selects one row, and outputs coded pixel data corresponding to the one row at a constant bit rate during a second cycle shorter than the first cycle.

According to the configuration, the coded pixel data is written in the FIFO unit during the first cycle, and read from the FIFO unit during the second cycle. The output bit rate of the coded pixel data from the FIFO unit can be equalized to the output bit rate (that is, a bit rate before the coding or an output bit rate in the case that the coding is not performed) of the pixel data from the row memory. Therefore, the output cycle (second cycle) of the coded pixel data from the FIFO unit can be shortened.

The compression unit may code N-bit (N is an integer of 2 or more) pixel data into n-bit (n is an integer of n<N) coded pixel data, and the FIFO unit may form an N-bit data string by decomposing and coupling a stored coded pixel data string, and sequentially outputs N-bit data of one row during the second cycle.

According to the configuration, the second cycle can be shortened to n/N of the first cycle.

The compression unit may use another pieces of pixel data in the identical row as a reference pixel, and calculate pixel data using an s-order expression (s is a natural number) to code the pixel data into coded pixel data having a fixed length.

According to the configuration, the pixel data can efficiently be coded at high speed.

The compression unit may perform variable length coding by substituting a variable length code for the pixel data.

According to the configuration, lossless encoding can be performed in units of rows at a high compression ratio.

The compression unit may divide pixel data of the row memory into plural pieces of partial data to perform variable length coding to each piece of partial data.

According to the configuration, the variable length coding is performed in each piece of partial data in which the number of bits is lower than that of the pixel data, so that the maximum length of the variable length code can be suppressed to reduce the whole code amount. The pieces of partial data can be coded in parallel.

The solid-state image capturing device may further include a selector unit that selects which compressed pixel data or non-compressed pixel data is output.

According to the configuration, which of the compressed pixel data and the non-compressed pixel data is output can separately be used according to a scene or an application.

The row memory may include: a first memory that stored pixel data corresponding to an even-numbered column; and a second memory that stores pixel data corresponding to an odd-numbered column, and the compression unit may include: a first compression unit that sequentially performs compression coding of the pixel data output from the first memory by referring to the pixel data stored in the first memory; and a second compression unit that sequentially performs compression coding of the pixel data output from the second memory by referring to the pixel data stored in the second memory.

According to the configuration, because each of the first compression unit and the second compression unit performs the compression coding of a half of the pixel data of one row, the coding can efficiently be performed at a half of an operating clock frequency. Therefore, the configuration is suitable for the solid-state image capturing device having the higher resolution (the larger number of pixels per one line). Because the compression can be performed in each of the colors that simultaneously output from one row, the configuration is suitable for the color solid-state image capturing device having a Bayer array or a stripe array.

The solid-state image capturing device may further include: a first FIFO (First In First Out) unit that stores coded pixel data from the first compression unit therein by a FIFO method and intermittently outputs the coded pixel data; and a second FIFO (First In First Out) unit that stores coded pixel data from the second compression unit therein by the FIFO method and intermittently outputs the coded pixel data, wherein each of the first FIFO unit and the second FIFO unit inputs the coded pixel data of a half of a row from the compression unit during a first cycle in a row selection cycle in which the row scanning unit selects one row, and outputs coded pixel data corresponding to the half of the row at a constant bit rate from each of the first FIFO unit and the second FIFO unit during a second cycle shorter than the first cycle.

According to the configuration, because each of the first FIFO unit and the second FIFO unit can perform an output operation at a half of an operating clock frequency, i.e. low frequency. Therefore, the configuration is suitable for the solid-state image capturing device having the higher resolution (the larger number of pixels per one line).

Each of the first compression unit and the second compression unit may code N-bit (N is an integer of 2 or more) pixel data into n-bit (n is an integer of n<N) coded pixel data, and each of the first FIFO unit and the second FIFO unit may form an N-bit data string by decomposing and coupling a stored coded pixel data string, and sequentially outputs N-bit data of one row during the second cycle.

According to the configuration, the second cycle can be shortened to n/N of the first cycle.

According to another aspect of the invention, an image capturing apparatus includes: the solid-state image capturing device; and an image processing LSI including a decoding unit that decodes the compressed pixel data output from the solid-state image capturing device.

According to the configuration, the image processing LSI receives and decodes the coded pixel data compressed by the solid-state image capturing device, so that a data transfer frequency can be suppressed on an image transmission path between the solid-state image capturing device and the image processing LSI. As a result, the power consumption can be reduced in a circuit region that acts as high-speed transmission from the solid-state image capturing device to the image processing LSI, and generation of an electromagnetic noise can also be reduced.

The selector unit may select the compressed pixel data in a preview mode and select the non-compressed pixel data in a still image mode.

According to the configuration, advantageously the power consumption can be reduced in preview that occupies a large portion of a use time of the image capturing apparatus while the non-compressed, high-quality image can be acquired in the still image mode.

The selector unit may select the non-compressed pixel data in a still image mode and select the compressed pixel data in a continuous image capturing mode.

According to the configuration, advantageously the non-compressed, high-quality image can be acquired in the still image mode while the number of continuous captured images per second can be enhanced in the continuous image capturing mode.

In the invention, the memory capacity is decreased, the cost performance can be improved, and the power consumption and the heat generation amount, which are caused by the memory access, can be reduced. Additionally, the degradation of the image capturing characteristic can be reduced.

BRIEF DESCRIPTION OF DRAWINGS

FIG. 10 is a view illustrating an example of data to which the synchronous code is added in the third exemplary embodiment.

FIG. 21 is a view illustrating an example of a variable length code in the fifth exemplary embodiment.

DESCRIPTION OF EMBODIMENTS

Hereinafter, embodiments of the invention will be described with reference to the drawings. In the following exemplary embodiments, because a component designated by the same reference mark performs a similar operation, sometimes the overlapping description is omitted.

First Exemplary Embodiment

An image capturing apparatus that performs compression coding to pieces of pixel data in one line without referring to pieces of pixel data of a different row will be described in a first exemplary embodiment (hereinafter, the data compression is referred to as one-line compression, and a circuit that performs the one-line compression is referred to as a one-line compression circuit).

Figure 1:
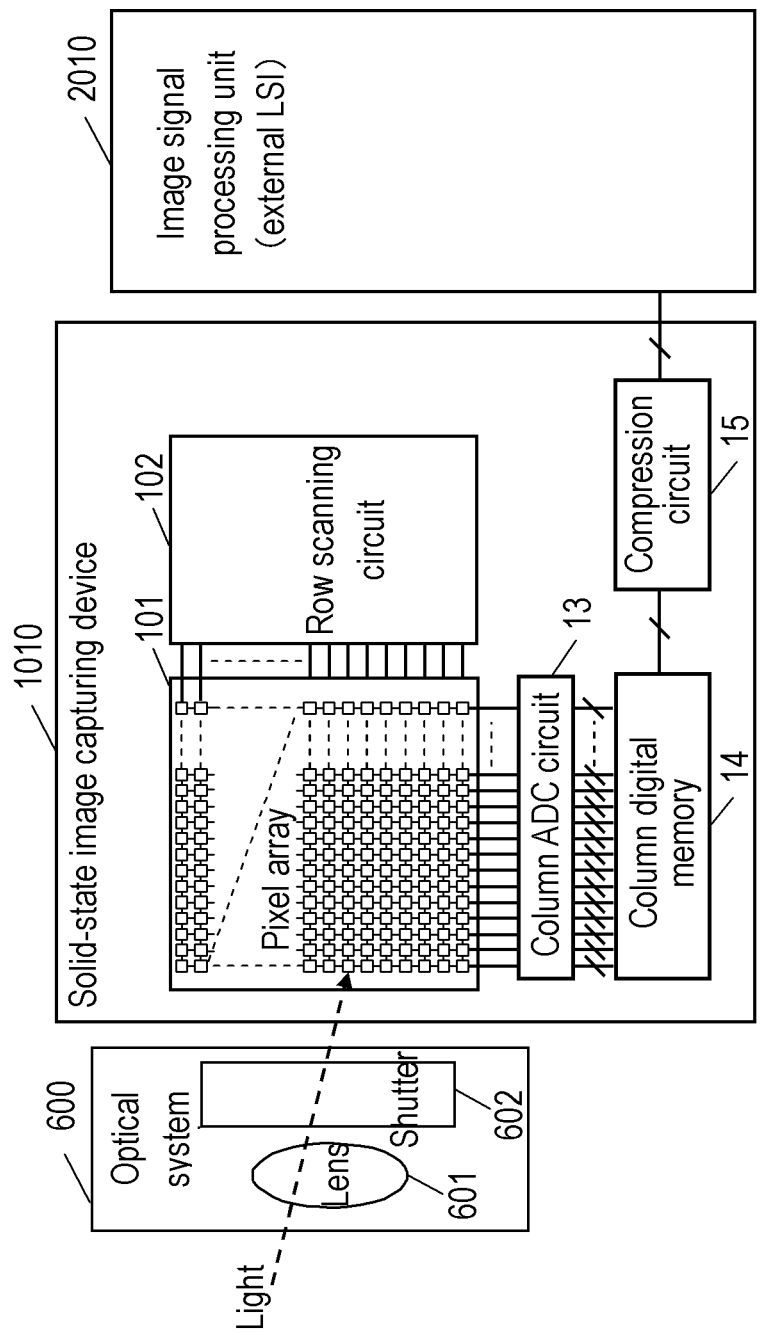
FIG. 1 is a block diagram illustrating a configuration of an image capturing apparatus according to a first exemplary embodiment.

FIG. 1 is a block diagram illustrating a configuration of the image capturing apparatus of the first exemplary embodiment. Referring to FIG. 1, the image capturing apparatus includes optical system 600, solid-state image capturing device 1010, and image signal processing unit 2010.

Optical system 600 includes lens 601 that collects light from a subject to form an image on an image capturing region of the solid-state image capturing device and mechanical shutter 602 that is located on an optical path between lens 601 and the solid-state image capturing device to control a light quantity guided onto the image capturing region.

Solid-state image capturing device 1010 includes pixel array 101, row scanning circuit 102, column ADC circuit 13, column digital memory 14, and one-line compression circuit 15.

Pixel array 101 is the image capturing region having plural pixels two-dimensionally arrayed.

Row scanning circuit 102 performs row scanning to sequentially select a row.

Column ADC circuit 13 simultaneously converts analog pixel signals output from plural pixels belonging to the row selected by row scanning circuit 102 into digital pixel data.

Column digital memory 14 is the row memory in which the digital pixel data of one row to which the A/D conversion has been performed.

One-line compression circuit 15 is the compression unit that sequentially performs compression coding to the pixel data output from column digital memory 14. When performing the compression coding to the pixel data, one-line compression circuit 15 refers to the pixel data belonging to the same row as the pixel data in question. That is, one-line compression circuit 15 performs the compression coding to the pixel data in one line without referring to the pixel data of the different row. Therefore, column digital memory 14 may have a memory capacity enough for the pixel data amount of one line.

Compared with the background art, in the image capturing apparatus of FIG. 1, the cost performance can be improved by decreasing the memory capacity and the power consumption and the heat generation amount, which are caused by the memory access, can be reduced. As a result, the degradation of the image capturing characteristic can be reduced.

Image signal processing unit 2010 includes a decoding unit that decodes the compressed pixel data output from solid-state image capturing device 1010.

As described above, as illustrated in FIG. 1, the solid-state image capturing device of the first exemplary embodiment includes: pixel array 101 in which pixels, each of which includes a photoelectric conversion unit that converts light into an electric signal, are two-dimensionally arrayed in a manner of m by n; row scanning circuit 102 that sequentially selects the pixels of the pixel array in units of rows; column ADC circuit 13 that simultaneously performs A/D conversion for one row to analog pixel signals output from the pixels selected in units of rows; column digital memory 14 that stores pixel data of one row output as a digital electric signal from column ADC circuit 13 therein and sequentially outputs the pixel data in each one pixel or each plural pixels; and one-line compression circuit 15 that compresses the pixel data output from column digital memory 14.

According to the configuration of the first exemplary embodiment, the compression coding is performed to the pixel data in one line without referring to the pixel data of the different row, so that the amount of memory installed necessary for the one-line compression circuit can be suppressed to the memory for one row.

Second Exemplary Embodiment

An image capturing apparatus that separately performs the compression coding to the pieces of pixel data belonging to one row while dividing the pieces of pixel data into the pixel data belonging to an odd-numbered column and the pixel data belonging to an even-numbered column will be described in a second exemplary embodiment.

Figure 2:
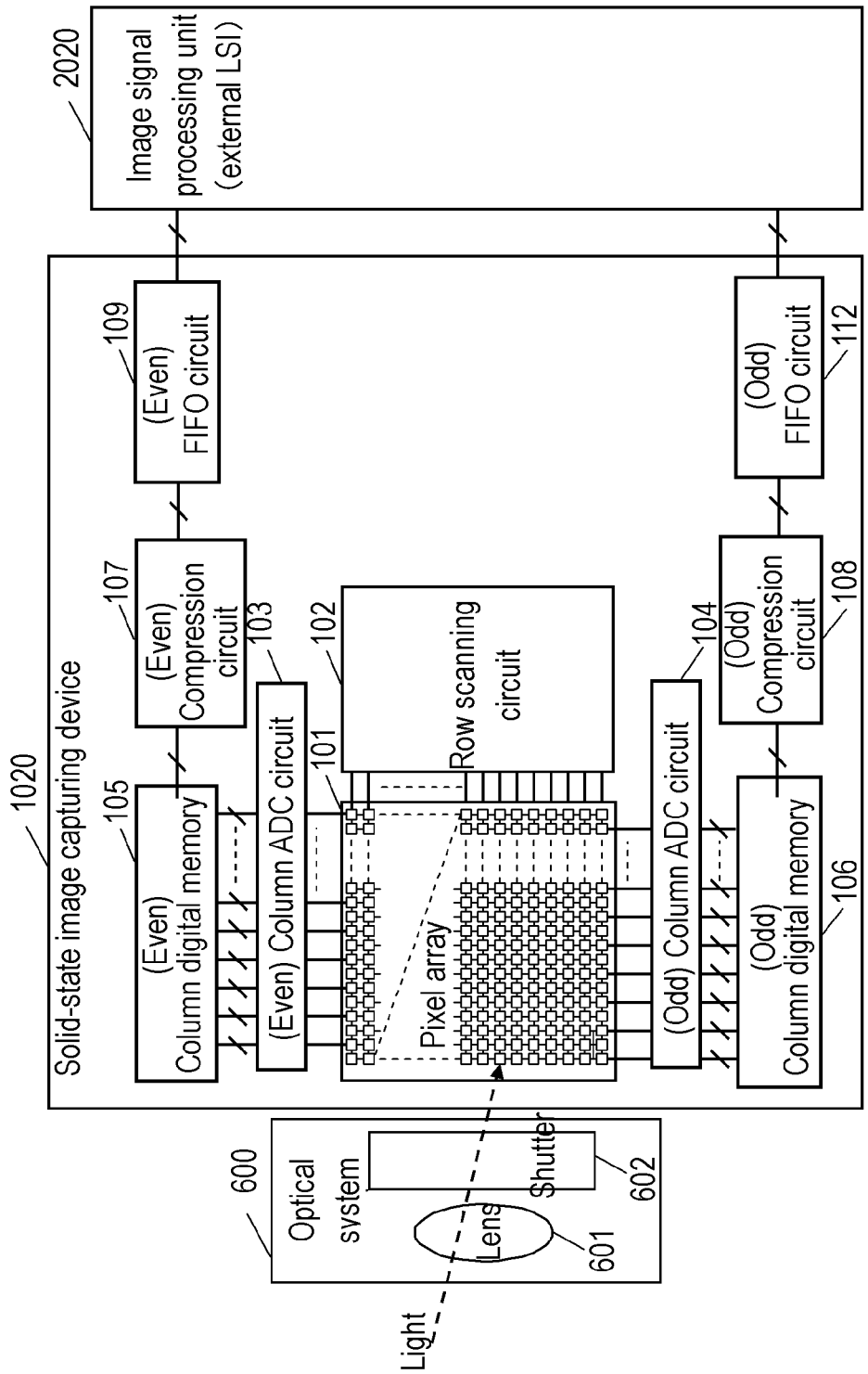
FIG. 2 is a block diagram illustrating a configuration of an image capturing apparatus according to a second exemplary embodiment.

FIG. 2 is a block diagram illustrating a configuration of the image capturing apparatus of the second exemplary embodiment. Referring to FIG. 2, the image capturing apparatus includes optical system 600, solid-state image capturing device 1020, and image signal processing unit 2020.

Solid-state image capturing device 1020 includes pixel array 101, row scanning circuit 102, column ADC circuit 103, column ADC circuit 104, column digital memory 105, column digital memory 106, one-line compression circuit 107, one-line compression circuit 108, FIFO circuit 109, and FIFO circuit 110.

When FIG. 1 is compared to FIG. 2, column ADC circuit 103 and column ADC circuit 104 correspond to column ADC circuit 13 of FIG. 1. That is, column ADC circuit 103 simultaneously converts the analog pixel signals, which are output from the pixels of the even-numbered columns in the plural pixels belonging to the row selected by row scanning circuit 102, into the digital pixel data. Column ADC circuit 104 simultaneously converts the analog pixel signals, which are output from the pixels of the odd-numbered columns in the plural pixels belonging to the row selected by row scanning circuit 102, into the digital pixel data.

Column digital memory 105 (first memory) and column digital memory 106 (second memory) correspond to column digital memory 14 (row memory) of FIG. 1. That is, the even-numbered-row pixel data to which the A/D conversion has been performed by column ADC circuit 103 is stored in column digital memory 105 (first memory). The odd-numbered-row pixel data to which the A/D conversion has been performed by column ADC circuit 104 is stored in column digital memory 106 (second memory).

One-line compression circuit 107 and one-line compression circuit 108 correspond to compression circuit 15 of FIG. 1. That is, one-line compression circuit 107 (first compression unit) refers to the pixel data stored in column digital memory 105 (first memory) and sequentially performs the compression coding to the pixel data output from column digital memory 105 (first memory). One-line compression circuit 108 (second compression unit) refers to the pixel data stored in column digital memory 106 (second memory) and sequentially performs the compression coding to the pixel data output from column digital memory 106 (second memory).

As described above, solid-state image capturing device 1020 is configured to separately perform the compression coding to the pieces of pixel data belonging to one row while dividing the pieces of pixel data belonging to one row into the pixel data belonging to the odd-numbered column and the pixel data belonging to the even-numbered column.

Figure 3A:
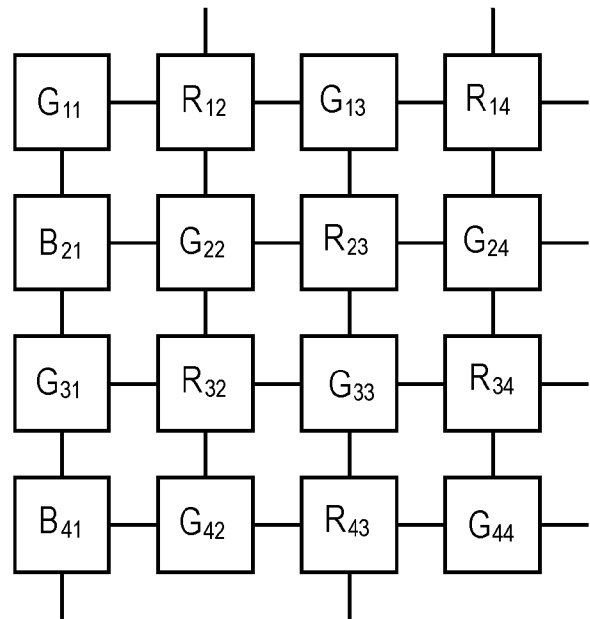
FIG. 3A is a view illustrating a Bayer array.

FIG. 3A is a view illustrating a Bayer array as an example of a color filter array of the pixels of pixel array 101. In FIG. 3A, for example a notation of G13 indicates the pixel in the first row and the third column. As illustrated in FIG. 3A, pixel array 101 constructed by m×n pixel is two-dimensionally arrayed with four pixels (R, G, G, and B) as one unit. In the Bayer array, because the even-numbered-row pixels in one row has the same color while the odd-numbered-row pixels in one row has the same color, the two colors are simultaneously read from one row.

As illustrated in FIG. 2, column ADC circuit 103 is the even-numbered-row A/D conversion unit that performs the A/D conversion to the even-numbered-row pixel signals output from pixel array 101 in units of rows.

Column ADC circuit 104 is the odd-numbered-row A/D conversion unit that performs the A/D conversion to the odd-numbered-row pixel signals output from pixel array 101 in units of rows.

Column digital memory 105 is the even-numbered-row column digital memory (first memory) that stores the even-numbered-row pixel data output from the even-numbered-row column ADC circuit 103 therein in units of rows and sequentially outputs the even-numbered-row pixel data in each plural pixels.

Column digital memory 106 is the odd-numbered-row column digital memory (second memory) that stores the odd-numbered-row pixel data output from the odd-numbered-row column ADC circuit 104 therein in units of rows and sequentially outputs the odd-numbered-row pixel data in each plural pixels.

One-line compression circuit 107 is the even-numbered-row compression circuit (first compression unit) that performs the one-line compression to the even-numbered-row pixel data output from the even-numbered-row column digital memory 105.

One-line compression circuit 108 is the odd-numbered-row compression circuit (second compression unit) that performs the one-line compression to the odd-numbered-row pixel data output from the odd-numbered-row column digital memory 106.

FIFO circuit 109 is the even-numbered-row FIFO circuit (first FIFO unit) that controls an output bit rate of the compressed even-numbered-row pixel data output from even-numbered-row one-line compression circuit 107.

FIFO circuit 110 is the odd-numbered-row FIFO circuit (second FIFO unit) that controls the output bit rate of the compressed odd-numbered-row pixel data output from odd-numbered-row one-line compression circuit 108. The pixel data belonging to the same row as the pixel data in question is referred to, but the pixel data of the different row is not referred to.

In the second exemplary embodiment, the compression circuit is configured in two systems, which allows the pixel data to be compressed in each color by referring to the same color pixel data belonging to the same row. Because the pixel data has high similarity to the adjacent pixel data having the same color, a statistical appearance frequency of small-value difference data is increased while a statistical appearance frequency of large-value difference data is decreased. Therefore, when the compression is performed by referring to the same color pixel data belonging to the same row, an SNR after the compression can be improved compared with the case that the compression is performed by referring to the pixel data except the same color pixel data belonging to the same row. A compression ratio can be enhanced by utilizing an increase of a statistical bias.

In the second exemplary embodiment, a transfer bit rate decreased by the compression is controlled to the same transfer bit rate as that before the compression by the configuration in which the FIFO circuit is installed, so that a time necessary to transfer the image data from the solid-state image capturing device to an external LSI can be shortened.

In the second exemplary embodiment, because the one-line compression circuit and the FIFO circuit are configured in two systems, the amount of memory installed can be suppressed up to the memory for two rows (the memory in which the pixel data of up to one row necessary for the one-line compression circuit is stored and the memory in which the coded pixel data of up to one row necessary for the FIFO circuit is stored), and the pixel data can be compressed while the amount of memory installed is suppressed to the minimum compared with the two-dimensional compression.

Figure 3B:
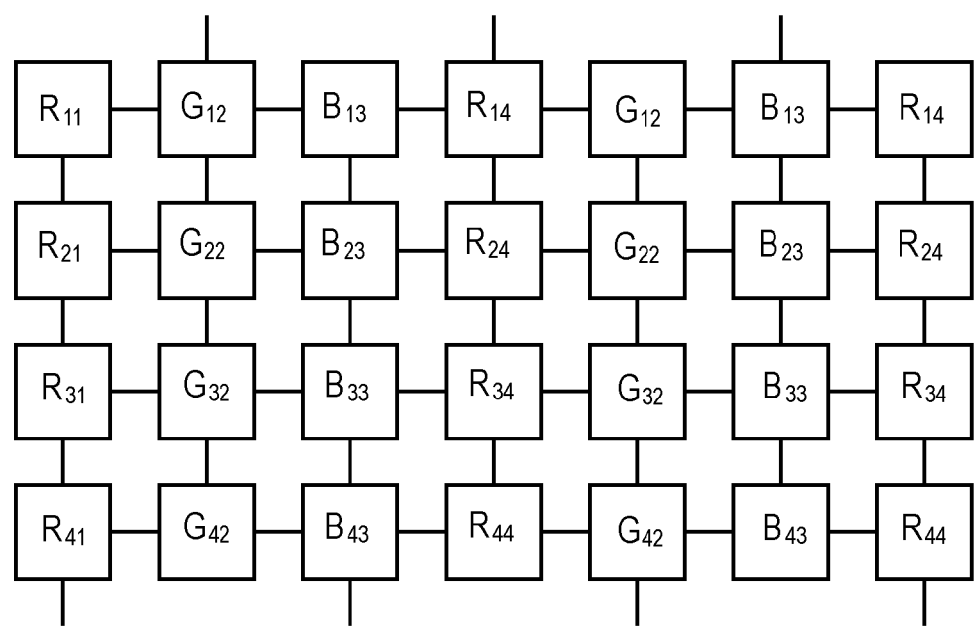
FIG. 3B is a view illustrating a stripe array.

In the second exemplary embodiment, the one-line compression circuit is configured in the two systems because the two colors of the pixels are simultaneously output from the same row. The one-line compression circuit may be configured in three systems when three colors of the pixels are simultaneously output from the same row (for example, three colors of R, G, and B are sequentially arrayed in one row when the color filter of the pixel array has a configuration of a stripe array as shown in FIG. 3B), and the one-line compression circuit may be configured in L systems when the number of color of the pixels simultaneously output from the same row is L (L is a natural number).

However, in the case that the even-numbered-row pixel data is read in a portion above the pixel array while the odd-numbered-row pixel data is read in a portion below the pixel array, because the colors of R, G, and B are output to both the portions above and below the pixel array, the one-line compression circuit may be constructed by three systems in the portion above the pixel array and three systems in the portion below the pixel array (six systems in total).

In the case of use of a configuration in which two signal read path is provided per column of the pixels in order to achieve speed enhancement of data read such that the pixels of two rows are simultaneously or substantially simultaneously read from the pixel array (for example, see Unexamined Japanese Patent Publication No. 2005-347932), the number of colors of the simultaneously output pixels usually becomes two in each of the portions above and below the pixel array (in a general Bayer array). Even in such cases, the one-line compression circuit may be constructed by the total of four systems, and the compression may be performed in each color by referring to the simultaneously output pixel data having the same color of the same row. However, in the case that the two-row simultaneous read is performed, irrespective of the compression, it is necessary to provide the column ADC circuit that converts the pieces of analog pixel data of two rows into the pieces of digital pixel data and the column digital memory in which the pieces of digital pixel data of two rows are stored, and therefore the amount of memory installed becomes double that of the second exemplary embodiment.

One FIFO unit having the same functions as the FIFO circuit 109 and the FIFO circuit 110 of the second exemplary embodiment may be provided in the solid-state image capturing device of the first exemplary embodiment. In this case, solid-state image capturing device 1010 of FIG. 1 may further include a FIFO unit that stores the coded pixel data from one-line compression circuit 15 therein by a FIFO (First In First Out) method and intermittently outputs the coded pixel data. The FIFO unit may input the pieces of coded pixel data of one row from one-line compression circuit 15 during a first cycle in a row selection cycle in which row scanning circuit 102 selects one row, and output the pieces of coded pixel data corresponding to the one row at a constant bit rate during a second cycle shorter than the first cycle.

Third Exemplary Embodiment

A solid-state image capturing device that performs data compression by referring to the pieces of pixel data of the same row as the compressed pixel will be described in a third exemplary embodiment. In the third exemplary embodiment, the solid-state image capturing device that separately perform the compression coding while dividing the pieces of pixel data of one row into the pieces of pixel data belonging to the odd-numbered row and the pieces of pixel data belonging to the even-numbered row will more specifically be described.

Figure 4:
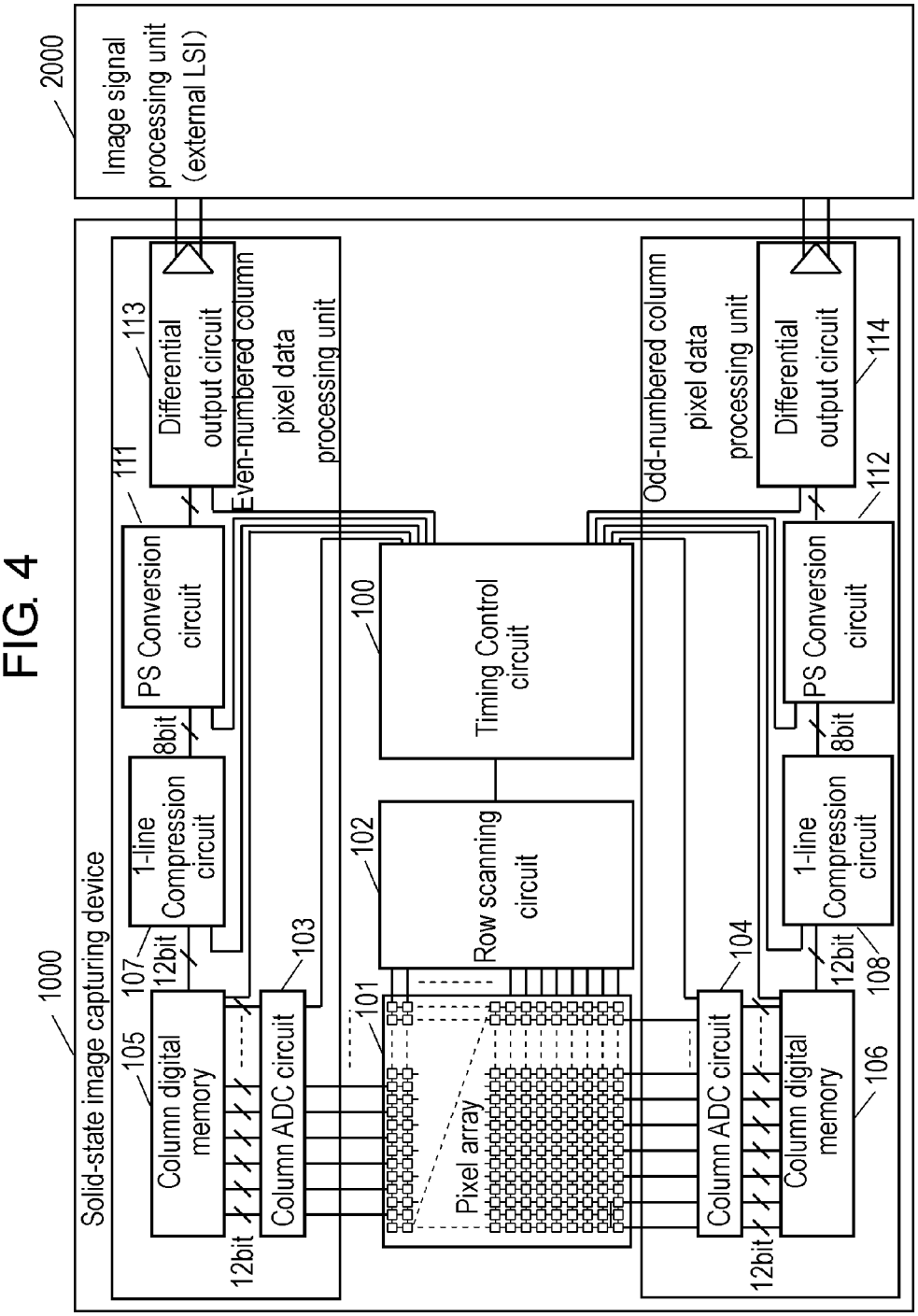
FIG. 4 is a block diagram illustrating a configuration example of a solid-state image capturing device according to a third exemplary embodiment.

FIG. 4 is a configuration diagram illustrating the solid-state image capturing device of the third exemplary embodiment and an image signal processing unit (external LSI). Although the image capturing apparatus includes optical system 600 of FIGS. 1 and 2, optical system 600 is omitted in FIG. 4.

Solid-state image capturing device 1000 includes row scanning circuit 102, column ADC circuit 103, column ADC circuit 104, column digital memory 105, column digital memory 106, one-line compression circuit 107, one-line compression circuit 108, PS conversion circuit 111, PS conversion circuit 112, differential output circuit 113, and differential output circuit 114.

Pixel array 101 is a MOS solid-state image capturing device having pixels of about 12 millions, and pixel array 101 is constructed by 3072×4096 pixels.

Timing control circuit 100 controls read timing, shutter scanning timing, and timing in which the pixel data input to each circuit.

Row scanning circuit 102 performs the read and shutter scanning in each row of pixel array 101.

Column ADC circuit 103 is the A/D conversion unit that simultaneously converts 2048 pieces of analog data, which are read from the even-numbered-row pixels of the row to which the read operation is performed by the row scanning circuit 102, into 12-bit digital data.

Column ADC circuit 104 is the A/D conversion unit that simultaneously converts 2048 pieces of analog data, which are read from the odd-numbered-row pixels of the same row, into 12-bit digital data.

Column digital memory 105 stores the pixel data after the conversion, and sequentially outputs the pixel data one by one.

Column digital memory 106 stores the pixel data after the conversion, and sequentially outputs the pixel data one by one.

One-line compression circuit 107 calculates a difference between the pieces of even-numbered-row pixel data output from column digital memory 105, and codes difference data by performing conversion to difference data using a linear expression.

One-line compression circuit 108 calculates a difference between the pieces of odd-numbered-row pixel data output from column digital memory 106, and codes difference data by performing the conversion to difference data using the linear expression.

PS conversion circuit 111 performs parallel-serial conversion to the compressed even-numbered-row pixel data after adding a 24-bit synchronous code to the compressed even-numbered-row pixel data.

PS conversion circuit 112 performs parallel-serial conversion to the compressed odd-numbered-row pixel data after adding a 24-bit synchronous code to the compressed odd-numbered-row pixel data.

Differential output circuit 113 converts the compressed even-numbered-row pixel data to which the parallel-serial conversion has been performed into a predetermined voltage level, and outputs the voltage level to the external LSI.

Differential output circuit 114 converts the compressed odd-numbered-row pixel data to which the parallel-serial conversion has been performed into a predetermined voltage level, and outputs the voltage level to the external LSI.

Figure 5:
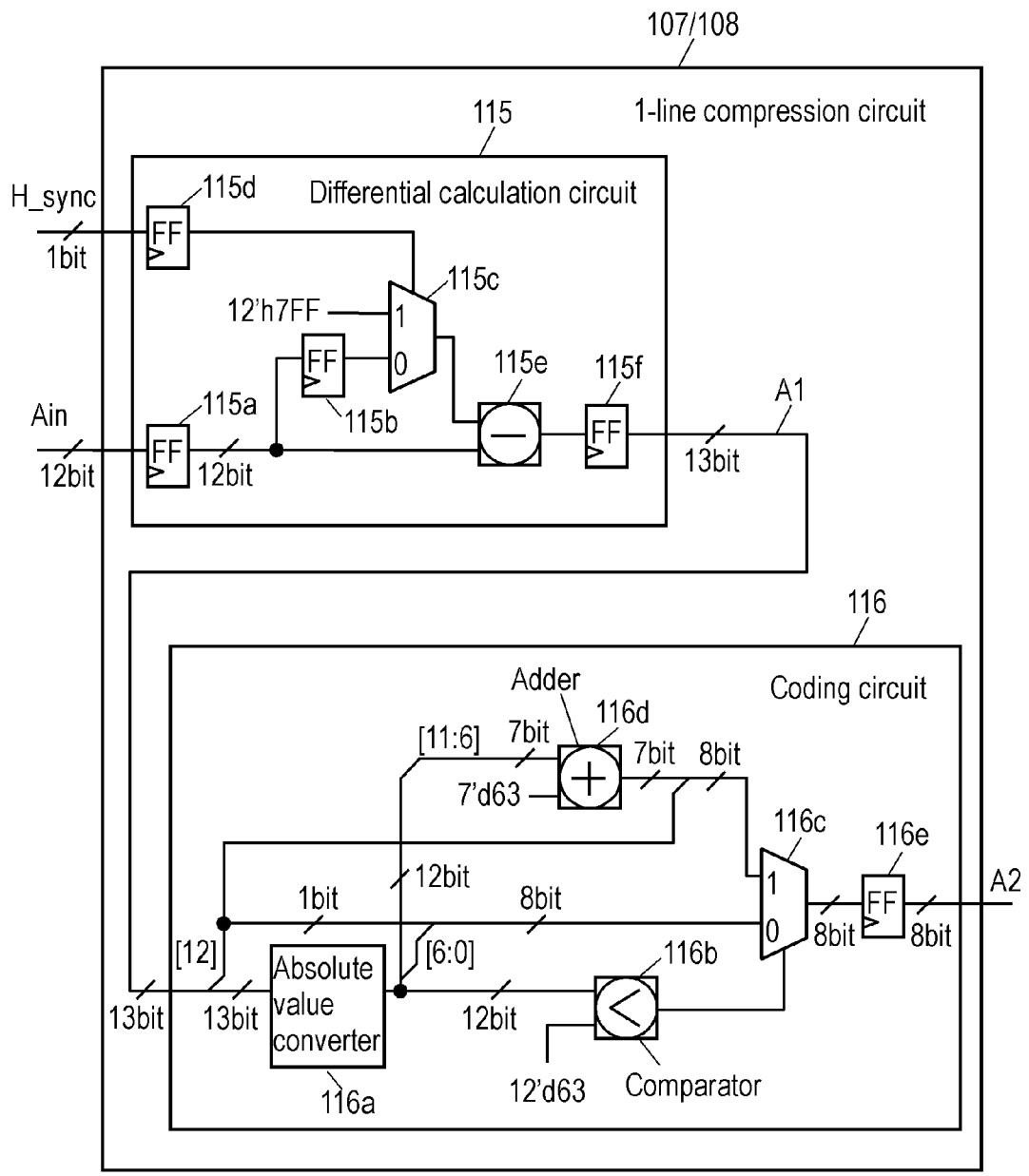
FIG. 5 is a block diagram illustrating a configuration example of a one-line compression circuit in the third exemplary embodiment.

FIG. 5 is a block diagram illustrating a configuration example of the one-line compression circuit in the third exemplary embodiment. As illustrated in FIG. 5, each of one-line compression circuits 107 and 108 includes difference calculation circuit 115 and coding circuit 116. Each of one-line compression circuits 107 and 108 codes N-bit (N is an integer of 2 or more) pixel data in n-bit (n is an integer of n<N) coded pixel data. In the example of FIG. 5, N is 12 and n is 8.

Difference calculation circuit 115 is a circuit that calculates the difference between the pixel data of a coding target and the pixel data in the same row (in FIG. 5, the preceding pixel data), and difference calculation circuit 115 includes 12-bit FF (Flip-Flop) 115a, 12-bit FF 115b, selector 115c, 1-bit FF 115d, subtractor 115e, FF 115f that retains and outputs 13-bit difference data.

Coding circuit 116 is a circuit that codes the difference data by performing the conversion of the difference data using the linear expression, and coding circuit 116 includes absolute value converter 116a, comparator 116b, selector 116c, adder 116d, and 8-bit FF 116e.

An operation of the solid-state image capturing device of the third exemplary embodiment having the above configuration will be described below.

In solid-state image capturing device 1000 of the third exemplary embodiment, a photocharge amount, in which the charge generated by the photoelectric conversion of the light quantity incident to each pixel of pixel array 101 is integrated by each pixel for a time from electronic shutter scanning controlled by row scanning circuit 102 to read scanning, becomes the pixel signal similarly to the general MOS solid-state image capturing device.

When row scanning circuit 102 selects an arbitrary xth row of pixel array 101 as read row, the pixel signals of 4096 pixels of the xth row are converted into the analog electric signals in the forms of the charge, the current, the voltage, and the like according to the pixel configuration, and the analog electric signals are output. In the 4096 analog pixel signals, 2048 even-numbered-row analog pixel signals are output to column ADC circuit 103, and 2048 odd-numbered-row analog pixel signals are output to column ADC circuit 104.

One of the features of the invention is that any A/D conversion method is adopted in column ADC circuit 104. Although the detailed A/D conversion is not described, irrespective of the conversion method, basically the A/D conversion is completed for the pixel signals of one row in one horizontal scanning cycle, and the converted digital data is immediately output to and stored in the column digital memory.

After the analog signals output from the 2048 even-numbered-row pixels are output from pixel array 101, column ADC circuit 103 converts the analog signals into pieces of 12-bit digital data. The 2048 pieces of even-numbered-row pixel data converted into the pieces of digital data are output to and stored in column digital memory 105.

Figure 6:
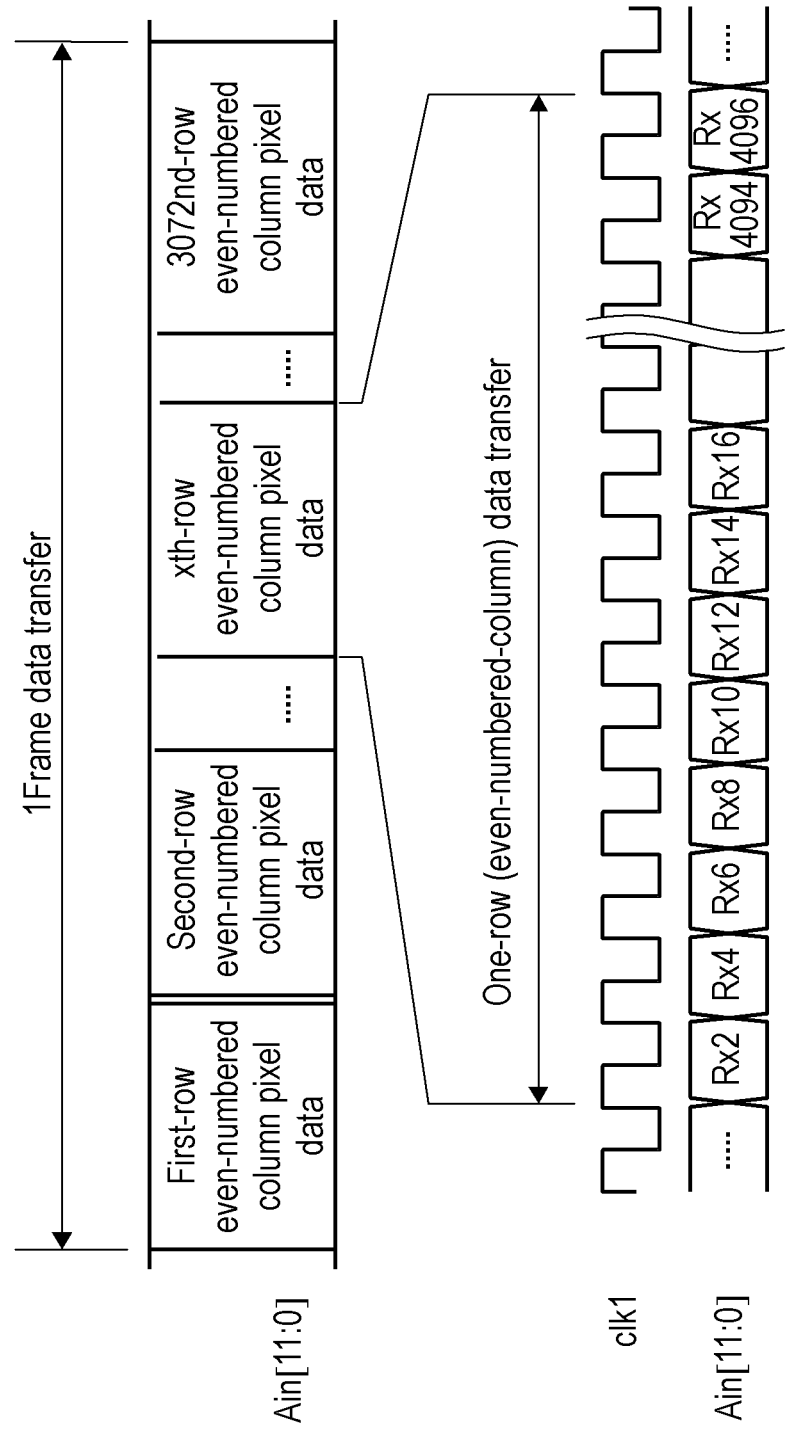
FIG. 6 is a view illustrating a timing chart of signal Ain input to one-line compression circuit 107 in the third exemplary embodiment.

The 2048 pieces of pixel data stored in column digital memory 105 are output one by one to one-line compression circuit 107 from column digital memory 105. FIG. 6 illustrates a timing chart of a signal Ain (12-bit pixel data) input to the one-line compression circuit 107.

Figure 7:
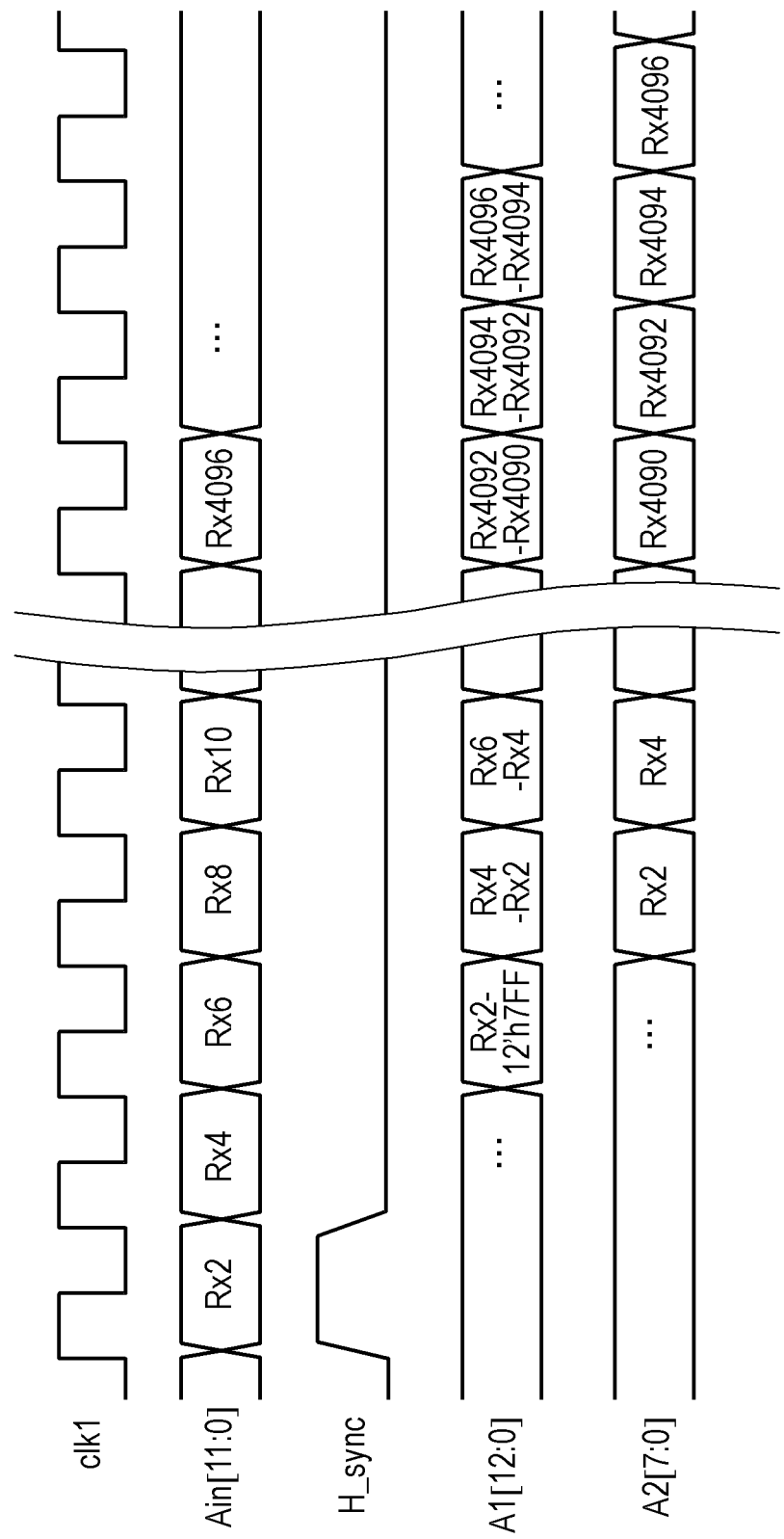
FIG. 7 is a view illustrating a timing chart of input and output signals of a difference calculation circuit and a coding circuit in the third exemplary embodiment.

Pixel data $R_{xy}$ ($R_{xy}$ means pixel data in xth row and yth column, and the same holds true for the following description) included in input signal Ain is input to one-line compression circuit 107 in synchronization with clock signal clk1. FIG. 7 illustrates a timing chart of input and output signals Ain, A1, and A2 of difference calculation circuit 115 and coding circuit 116. As illustrated in FIG. 7, in one-line compression circuit 107, pixel data $R_{xy}$ becomes $R_{xy}-R_{xy-2}$ in which pixel data $R_{xy-2}$ that is input in the preceding cycle is subtracted from $R_{xy}$ by difference calculation circuit 115, and $R_{xy}-R_{xy-2}$ is output as 13-bit output signal A1 to coding circuit 116 while a code bit indicating a positive or negative value is added thereto. Difference calculation circuit 115 senses initial pixel data Rx2 of each row using H_sync signal input from timing control circuit 100, and performs subtraction in subtraction processing of the initial pixel data of each row while setting the preceding pixel data to 12'h7FF. At this point, "12'h7FF" means that "7FF" is a hexadecimal notation of the 12 bits. In the case that a subtraction result becomes negative, the subtraction result is output as a complement number of 2.

Figures 8, 9:
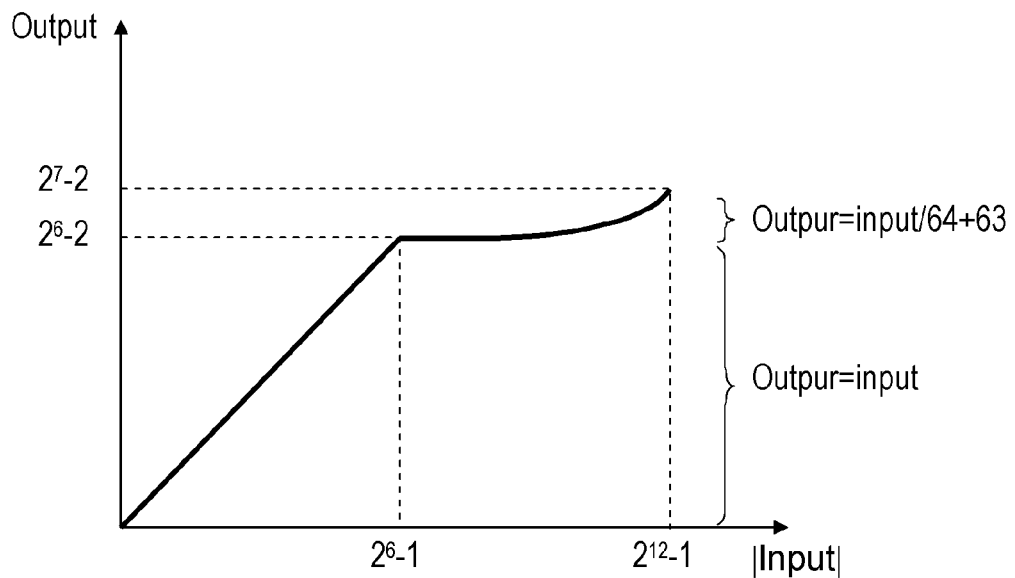
FIG. 8 is a view illustrating an example of a synchronous code in the third exemplary embodiment.
FIG. 9 is a view illustrating an input and an output of the coding circuit in the third exemplary embodiment.

Coding circuit 116 converts the difference data output from difference calculation circuit 115 into an absolute value using a correspondence relationship illustrated in FIG. 9. In the case that the absolute value of the difference data ranges from 0 to 63, the difference data is directly output. In the case that the absolute value of the difference data is 64 or more, the difference data is converted into 7-bit data according to (input_data/64+63) (at this point, the subtraction of input_data/64 is performed by a right shift by 6 bits, and numbers after a decimal point are truncated). A code bit of a 13th bit of the difference data is added to an 8th bit, and the difference data is output as an 8-bit coded pixel data (hereinafter referred to as a coded pixel data).

In coding circuit 116, the synchronous code (FIG. 8) added by PS conversion circuit 111 in a subsequent stage is considered, a data value of 8'hFF is set to an inhibition code in order to identify the synchronous code in the external LSI, and it is necessary that the value of 8'hFF be not generated in the coded pixel data. At this point, in the conversion of the absolute value, the output value ranges from 0 to $2^7-2$, and 8'hFF=$2^7-1$ is not generated, whereby no trouble is generated.

The coding method focuses on the facts that the pixel data has high similarity to the adjacent pixel data, and that a statistical appearance frequency of small-value difference data is increased while a statistical appearance frequency of large-value difference data is decreased. Therefore, the SNR after the compression can be improved such that the range of 0 to 63 where the difference data has the high appearance frequency is not coded.

The coded pixel data coded by coding circuit 116 is output as output signal A2 of coding circuit 116, and input to PS conversion circuit 111. PS conversion circuit 111 converts 8-bit parallel data into bit serial data, and inputs the bit serial data to differential output circuit 113 at a data rate that is 8 times clock signal clk1.

Figure 11:
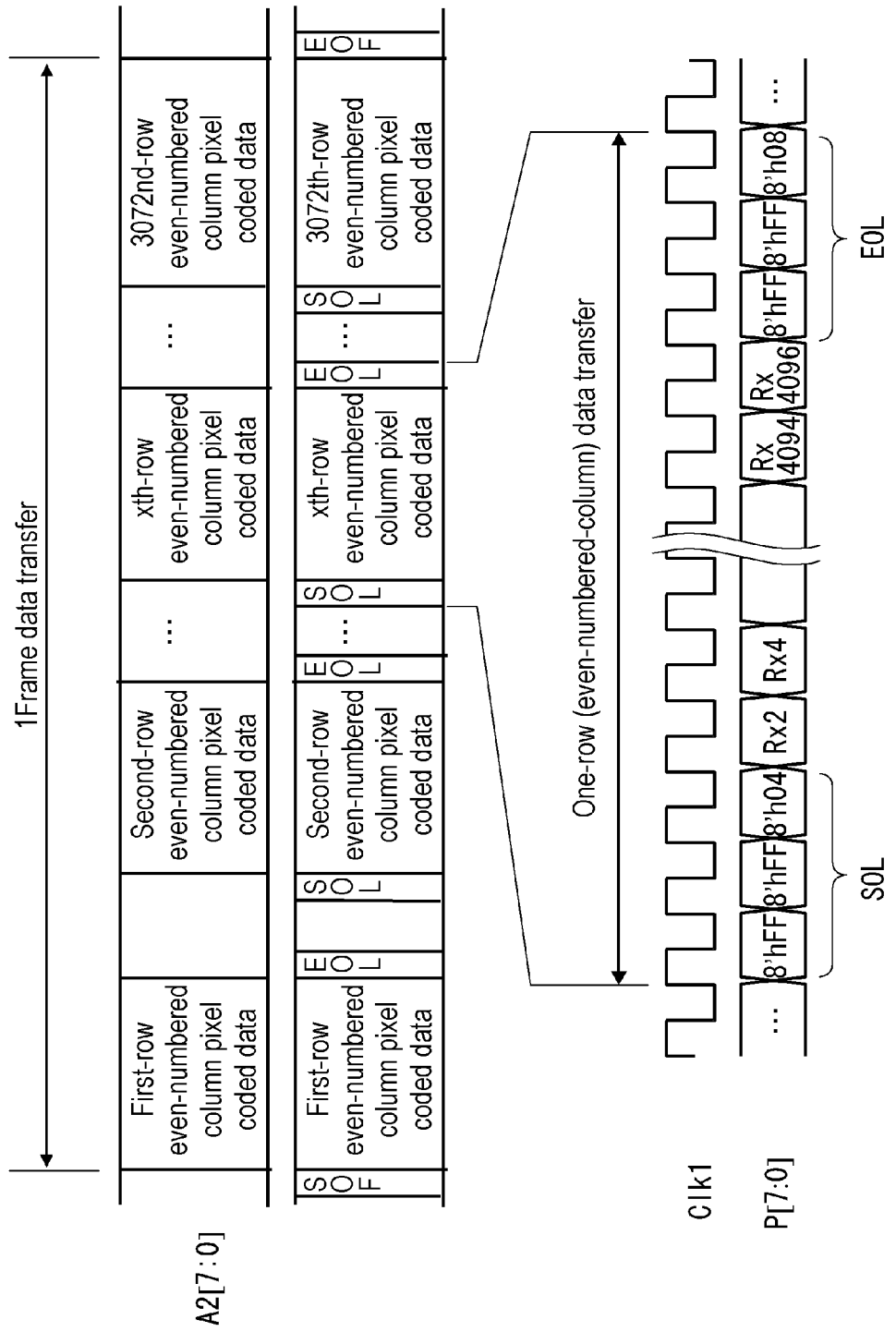
FIG. 11 is a view illustrating an output example of the data to which the synchronous code is added in the third exemplary embodiment.

In the case that high-speed serial output is performed, in order to inform the external LSI of starting and ending of a one-frame effective pixel and starting and ending of a one-row effective pixel, for example, the synchronous codes fixed as illustrated in FIG. 8 are usually output before and after effective pixel data as illustrated in FIG. 10. In the third exemplary embodiment, PS conversion circuit 111 converts the pixel data into the serial data after inserting the synchronous codes (converted into P[7:0]) in signal A2[7:0] input to the circuit as illustrated in the timing chart of FIG. 11.

The pixel data converted into the serial data is transferred to differential output circuit 113. The pixel data transferred to differential output circuit 113 is converted into the predetermined voltage level by differential output circuit 113, and transmitted as a differential signal to the external LSI. In order to implement the speed enhancement and the low power consumption, desirably differential output circuit 113 is a small-amplitude differential signal transmission system, such as low voltage differential signaling, which can suppresses the electromagnetic wave noise and the power consumption during the high-speed transmission.

The same processing as the even-numbered-row image data is performed to odd-numbered-row image data by the same circuit as the even-numbered-row image data, and the differential signal is output to the external LSI.

As described above, according to the third exemplary embodiment, the total amount of image data can be compressed and reduced to ⅔ by the one-line compression. As to the memory necessary for the one-line compression, in one-line compression circuits 107 and 108, it is only necessary to extend a register corresponding to the pieces of pixel data of about 8 pixels necessary for the coding processing.

In the case of the non-compression, it is necessary that PS conversion circuits 111 and 112 and differential output circuits 113 and 114 are driven at the operating frequency 12 times as much as the frequency of clock signal clk1. According to the third exemplary embodiment, because the 12-bit pixel data is compressed to the 8-bit coded pixel data, PS conversion circuits 111 and 112 and differential output circuits 113 and 114 are driven at the operating frequency 8 times as much as the frequency of clock signal clk1, and the operating frequency are decreased to ⅔, so that the power consumption can largely be reduced.

Figure 12:
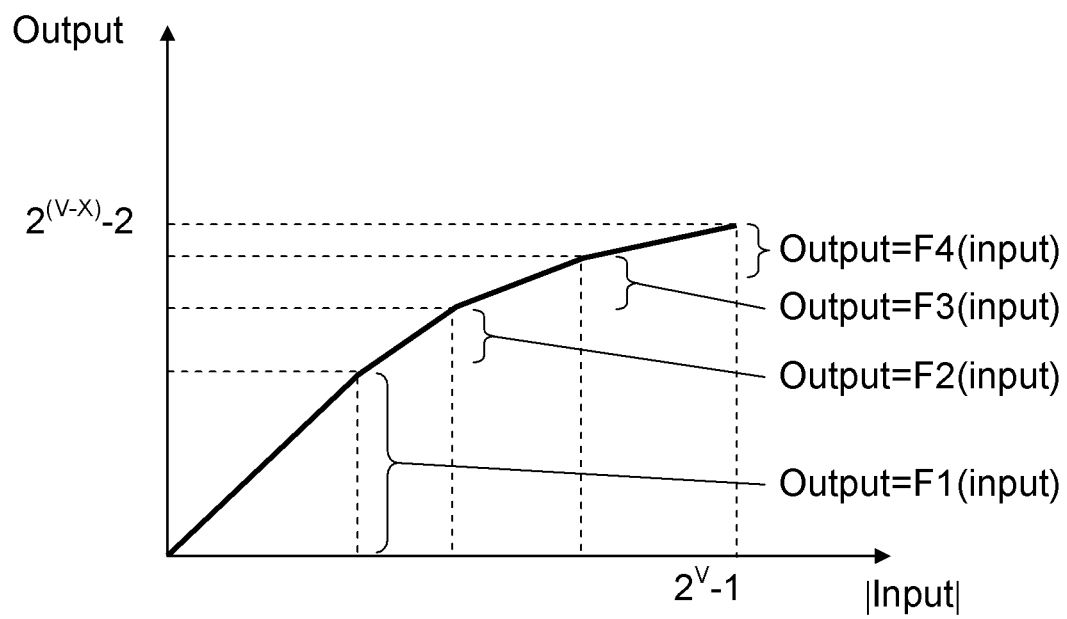
FIG. 12 is an explanatory view illustrating a coding circuit according to a modification of the third exemplary embodiment.

In the third exemplary embodiment, by way of example, one-line compression circuit 107 refers to another piece of pixel data belonging to the same row as the reference pixel data, and calculates the pixel data using the linear expression to code the pixel data in the coded pixel data having the fixed length. That is, in the calculation processing for coding the difference data, as illustrated in FIG. 9, the coding is performed while divided into the region where the difference value is 64 or more and the region where the difference value is 63 or less. Alternatively, one-line compression circuit 107 may refer to another piece of pixel data belonging to the same row as the reference pixel data, and calculate the pixel data using an s-order (s is a natural number) expression to code the pixel data in the coded pixel data having the fixed length. FIG. 12 illustrates a coding characteristic in the case of s=3. The example of FIG. 12 indicates that a V-bit pixel data (input in FIG. 12) is coded in a (V−X)-bit code (output in FIG. 12). Where V and X are natural numbers satisfying V>X. As illustrated in FIG. 12, according to the difference value, the coding calculation may be performed such that the calculation processing is switched by dividing the calculation processing into plural conditions.

Fourth Exemplary Embodiment

Figure 13:
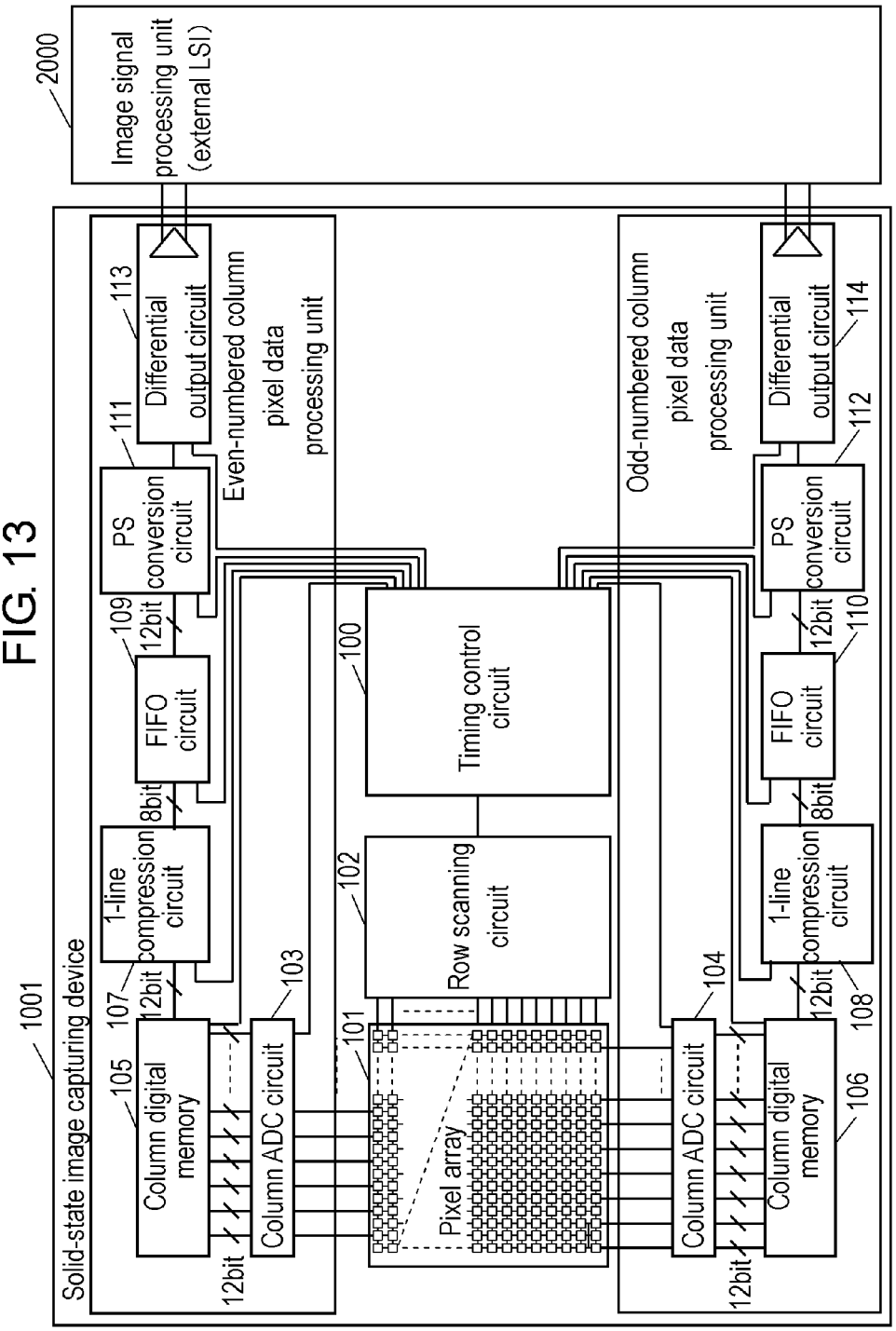
FIG. 13 is a block diagram illustrating a configuration example of a solid-state image capturing device according to a fourth exemplary embodiment.

A configuration, in which the FIFO circuit that stores the coded pixel data from the one-line compression circuit therein by the FIFO (First In First Out) method and intermittently outputs the coded pixel data is added to the solid-state image capturing device of the third exemplary embodiment of FIG. 4, will be described in a fourth exemplary embodiment. The FIFO circuit inputs the pieces of coded pixel data of one row from the compression unit during the first cycle in the row selection cycle in which the row scanning unit selects one row, and outputs the pieces of coded pixel data corresponding to the one row at a constant bit rate during the second cycle shorter than the first cycle. The output bit rate of the coded pixel data from the FIFO circuit can be equalized to the output bit rate (that is, the bit rate before the coding or the output bit rate in the case that the coding is not performed) of the pixel data from the row memory. Therefore, the output cycle (second cycle) of the coded pixel data from the FIFO circuit can be shortened. FIG. 13 is a block diagram illustrating a configuration of the solid-state image capturing device of the fourth exemplary embodiment. Solid-state image capturing device 1001 of FIG. 13 differs from solid-state image capturing device 1000 of the third exemplary embodiment of FIG. 4 in that FIFO circuit 109 and FIFO circuit 110 are added. The different point will mainly be described below, and the same point is omitted.

FIFO circuit 109 stores the even-numbered-row pixel data compressed by one-line compression circuit 107 therein by the FIFO method, and controls the transfer bit rate such that the stored data is intermittently output.

FIFO circuit 110 stores the odd-numbered-row pixel data compressed by one-line compression circuit 108 therein by the FIFO method, and controls the transfer bit rate such that the stored data is intermittently output.

Figure 14:
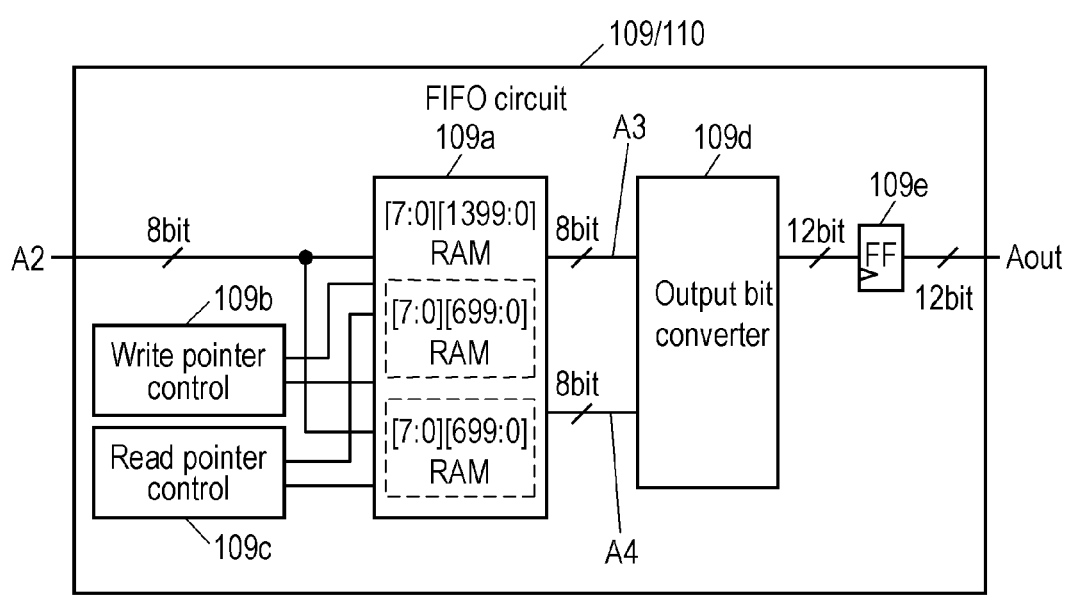
FIG. 14 is a block diagram illustrating a configuration example of a FIFO circuit in the fourth exemplary embodiment.

FIG. 14 is a block diagram illustrating a configuration example of FIFO circuits 109 and 110. Referring to FIG. 14, each of FIFO circuits 109 and 110 includes RAM 109a, write pointer control 109b, read pointer control 109c, output bit converter 109d, and FF (Flip-Flop) 109e (in this case, a 12-bit latch circuit).

FIFO circuits 109 and 110 are operated by a synchronous FIFO method in which a write operation and a read operation are synchronously performed to RAM 109a by write pointer control 109b and read pointer control 109c. RAM 109a is configured to have a capacity of about 1400 words (at this point, it is assumed that 1 word is an 8-bit data amount) for each of FIFO circuits 109 and 110 (FIFO circuits 109 and 110 have a total of memories corresponding to the pieces of pixel data of ½ row). Output bit converter 109d converts an n-bit coded pixel data string input from RAM 109a into an N-bit data string by decomposing and coupling the n-bit coded pixel data string. In the example of FIG. 14, n is 8 and N is 12.

An operation of the solid-state image capturing device of the fourth exemplary embodiment having the above configuration will be described below.

In the fourth exemplary embodiment, when row scanning circuit 102 performs the read scanning to an arbitrary xth row, pixel array 101, column ADC circuit 103, and column digital memory 105 perform the same operations as the third exemplary embodiment, and the pixel data indicated by signal Ain of FIG. 6 is input to one-line compression circuit 107.

Figure 15:
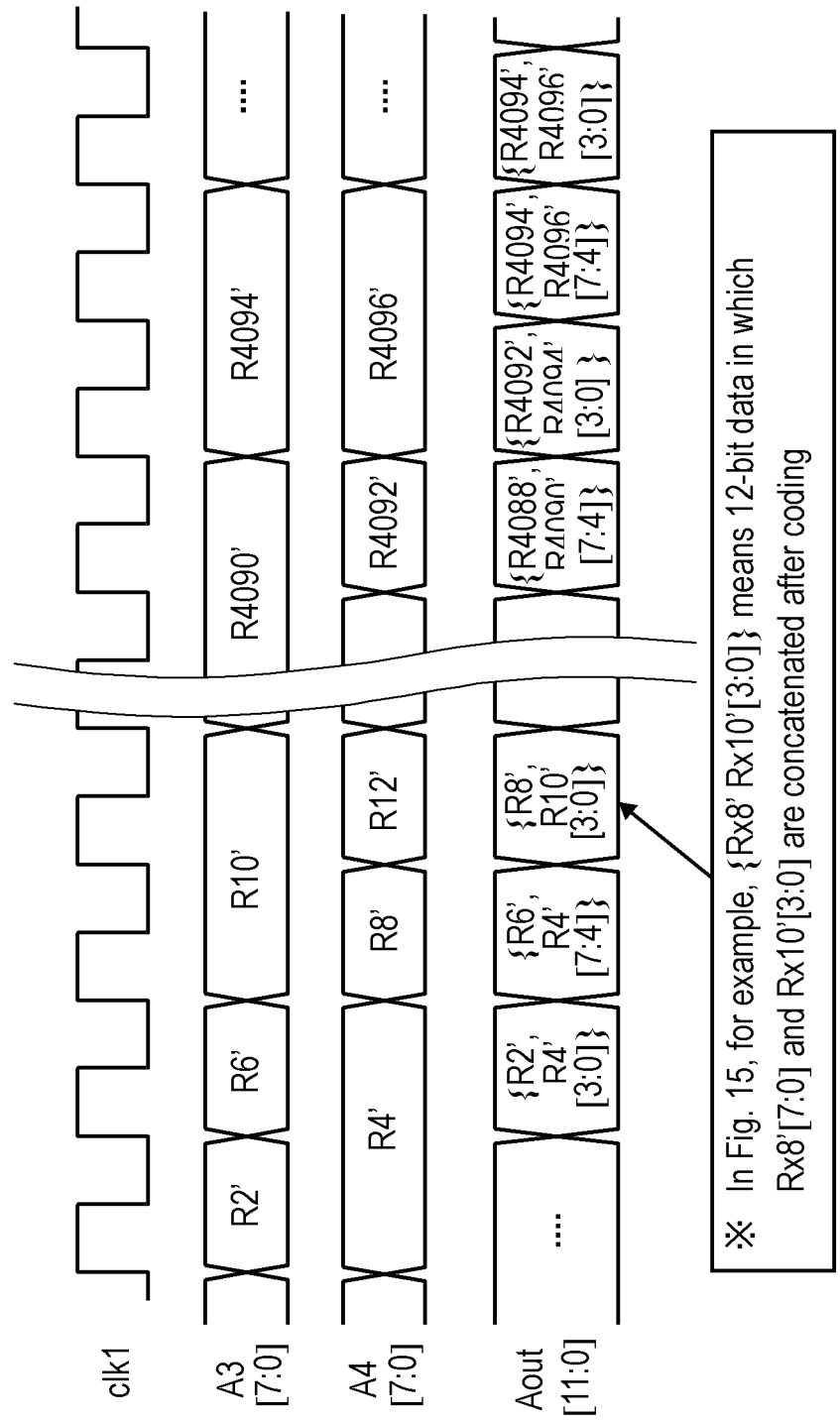
FIG. 15 is a view illustrating a timing chart of a data string of the FIFO circuit in the fourth exemplary embodiment.

One-line compression circuit 107 performs the coding processing to the input pixel data, and outputs the pixel data to FIFO circuit 109. FIFO circuit 109 starts to write the coded pixel data in the built-in RAM in conjunction with the starting of the output to one-line compression circuit 107, and FIFO circuit 109 starts to read the coded pixel data from the built-in RAM after storing the about 1370 (the number of pixels corresponding to ⅓ of one row) pieces of coded pixel data in the built in RAM. As indicated by signal Aout in FIG. 15, in the coded pixel data, output bit converter 109d of FIG. 14 combines 8 bits of one piece of pixel data and higher or lower 4 bits of another piece of pixel data to convert a bit width of the output signal from 8 bits into 12 bits, and outputs the 12-bit output signal.

Figure 16:
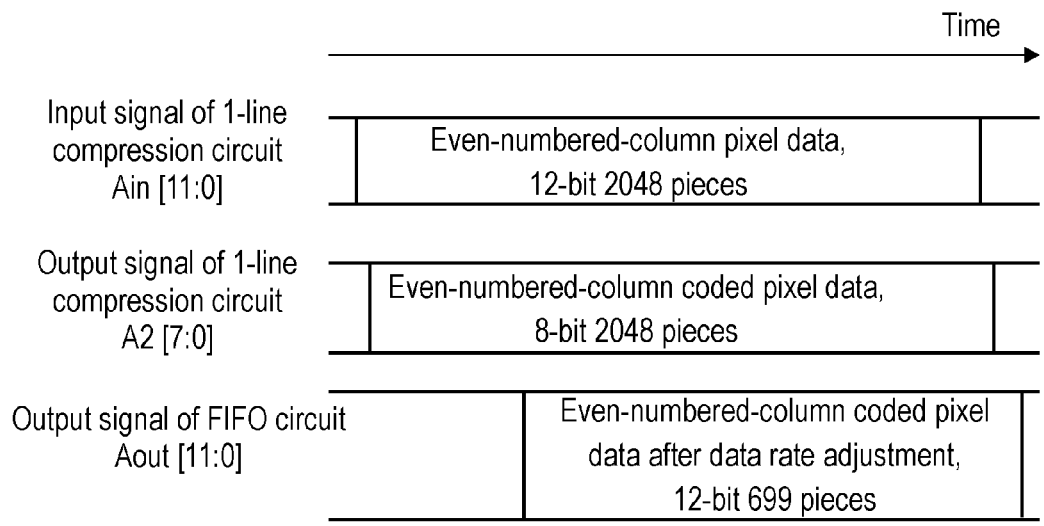
FIG. 16 is an explanatory view illustrating the data string that is input to and output from the one-line compression circuit and the FIFO circuit in the fourth exemplary embodiment.

When FIFO circuit 109 is operated as described above, the pixel data coded by one-line compression circuit 107 is output while the data rate, which is decreased to 8 bits per unit time in the decoding, is adjusted to 12 bits per unit time before the coding as illustrated in FIG. 16.

The pixel data whose output data rate is changed by FIFO circuit 109 is input to PS conversion circuit 111. PS conversion circuit 111 converts the 12-bit parallel data into the bit serial data, and inputs the bit serial data to differential output circuit 113 at a data rate 12 times as much as the data rate of clock signal clk1. PS conversion circuit 111 converts the parallel data into the serial data while the synchronous code is added to the pixel data in order that the external LSI synchronizes the pixel data.

The pixel data converted into the serial data is transferred to differential output circuit 113. The pixel data transferred to differential output circuit 113 is converted into the predetermined voltage level by differential output circuit 113, and transmitted as the differential signal to the external LSI. In order to implement the speed enhancement and the low power consumption, desirably differential output circuit 113 is the small-amplitude differential signal transmission system, such as the low voltage differential signaling, which can suppresses the electromagnetic wave noise and the power consumption during the high-speed transmission.

The same processing as the even-numbered-row image data is performed to odd-numbered-row image data by the same circuit as the even-numbered-row image data, and the differential signal is output to the external LSI.

As described above, according to the fourth exemplary embodiment, the total amount of image data can be compressed and reduced to ⅔ by the one-line compression. Additionally, the time necessary to output the pixel data to the external LSI can be shortened to ⅔ by controlling the data rate, which the decreased in the coding.

Figure 17:
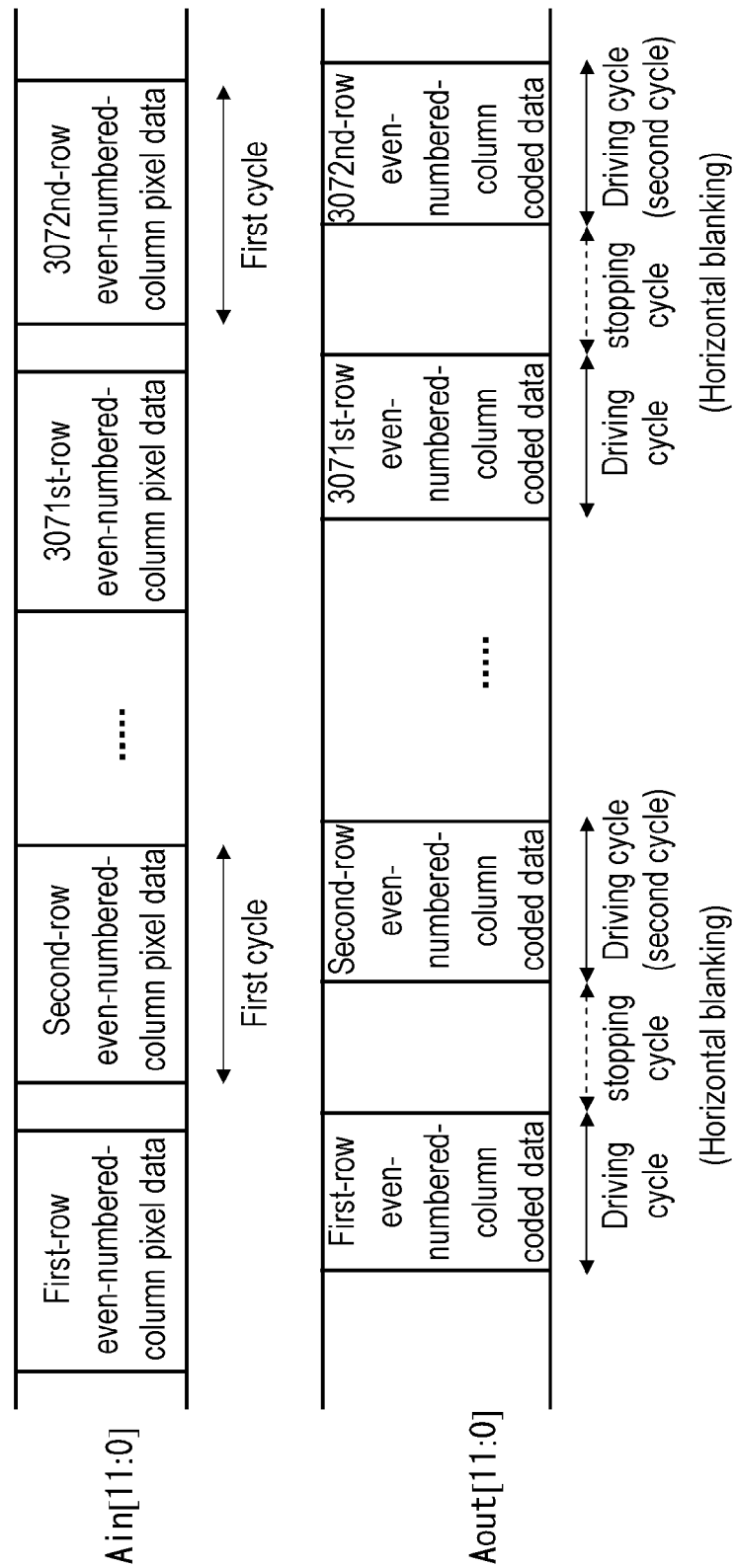
FIG. 17 is an explanatory view illustrating the data string that is input to and output from the FIFO circuit in the fourth exemplary embodiment.

According to the fourth exemplary embodiment, because the time necessary to output the pixel data to the external LSI is shortened to ⅔, a driving cycle of the circuit can be shortened while a clock stopping cycle is lengthened as illustrated in FIG. 17, and the power consumption can be reduced.

In the sum total of one-line compression circuits 107 and 108, the register corresponding to the pieces of pixel data of several pixels necessary for the subtraction processing and the coding processing is enough for the memory necessary for the one-line compression. Only the memory corresponding to the pieces of pixel data of ½ of the row may be expanded even in the sum total of the RAM (the memory corresponding to the pieces of pixel data of ½ of the row) and the register that performs the FIFO processing.

Fifth Exemplary Embodiment

A solid-state image capturing device including a one-line compression circuit, which does not compress the pixel data to the code having the fixed length but compress the pixel data to a code having a variable length, will be described in a fifth exemplary embodiment. The one-line compression circuit that divides the pixel data of the coding target into plural pieces of partial data to perform variable length coding to each piece of partial data will be described as a specific example. The variable length coding is performed in each piece of partial data in which the number of bits is smaller than that of the pixel data, so that a maximum length of a variable length code can be suppressed to reduce the whole code amount. The pieces of partial data can be coded in parallel.

Figure 18:
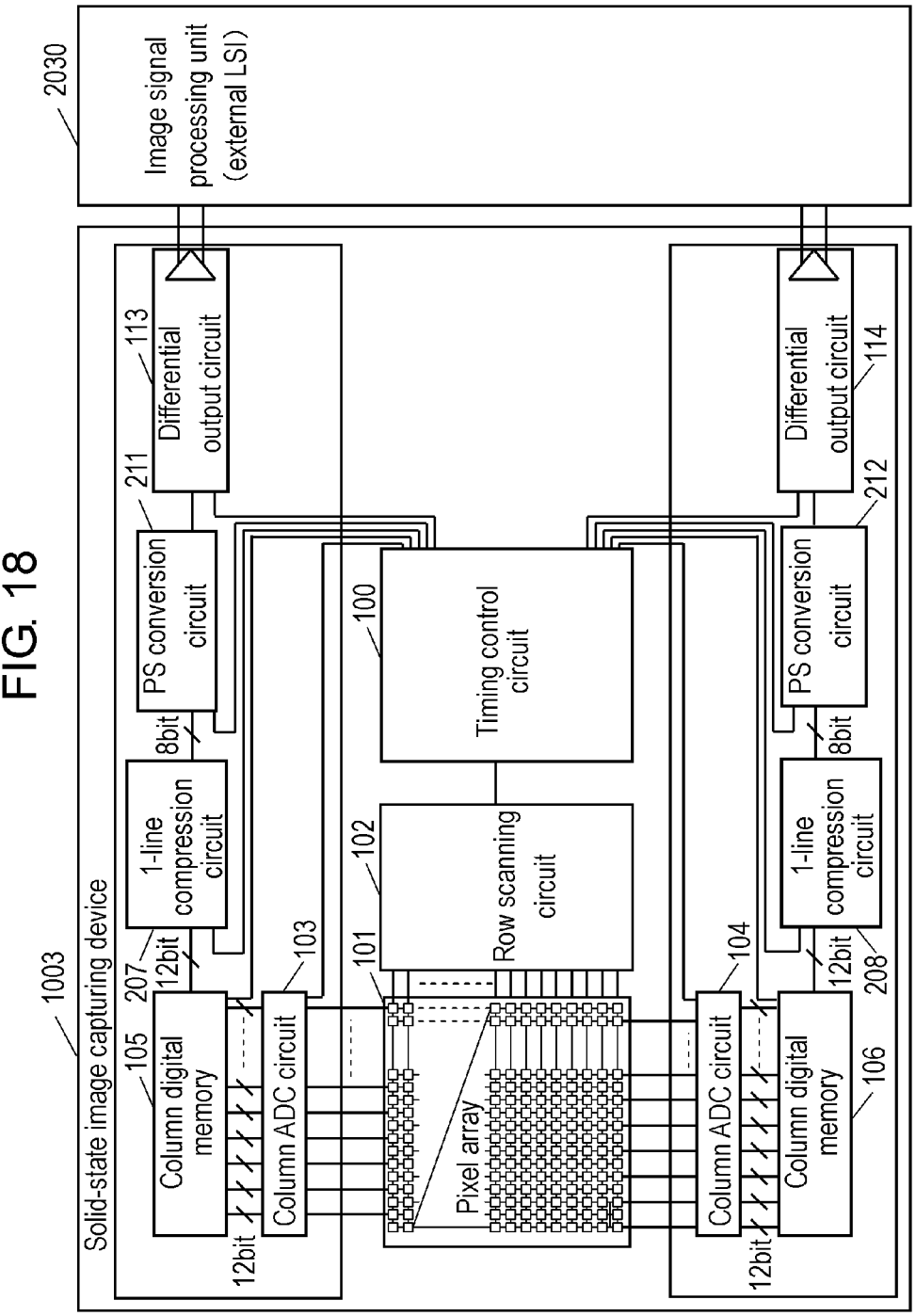
FIG. 18 is a block diagram illustrating a configuration example of an image capturing apparatus according to a fifth exemplary embodiment.

FIG. 18 is a block diagram illustrating a configuration of the image capturing apparatus of the fifth exemplary embodiment.

Referring to FIG. 18, solid-state image capturing device 1003 is a MOS solid-state image capturing device having pixels of about 12 millions, and solid-state image capturing device 1003 includes: pixel array 101 that is constructed by 3072×4096 pixels; timing control circuit 100 that controls the read timing, shutter scanning timing, and the timing in which the pixel data is input to each circuit; row scanning circuit 102 that performs the read and the shutter scanning in each row of pixel array 101; column ADC circuit 103 that simultaneously converts 2048 pieces of analog data, which are read from the even-numbered-row pixels of the row in which the read operation is performed by row scanning circuit 102, into the 12-bit digital data; column digital memory 105 that stores the pieces of pixel data after the conversion therein and sequentially outputs the pixel data one by one; column ADC circuit 104 that simultaneously converts 2048 pieces of analog data, which are read from the odd-numbered-row pixels of the same row, into the 12-bit digital data; column digital memory 106 that stores the pieces of pixel data after the conversion therein and sequentially outputs the pixel data one by one; one-line compression circuit 207 that performs the variable length coding to the pieces of even-numbered-row pixel data output from the column digital memory 105 by substituting a code corresponding to a predetermined value for the predetermined value; one-line compression circuit 208 that performs the variable length coding to the pieces of odd-numbered-row pixel data output from the column digital memory 106 by substituting a code corresponding to a predetermined value for the predetermined value; PS conversion circuit 211 that performs the parallel-serial conversion to the pieces of coded even-numbered-row pixel data after adding the 24-bit synchronous code to the pieces of coded even-numbered-row pixel data; PS conversion circuit 212 that performs the parallel-serial conversion to the pieces of coded odd-numbered-row pixel data after adding the 24-bit synchronous code to the pieces of coded odd-numbered-row pixel data; differential output circuit 113 that converts the pieces of even-numbered-row pixel data to which the parallel-serial conversion has been performed into a predetermined voltage level and output the predetermined voltage level to the external LSI; and differential output circuit 114 that converts the pieces of odd-numbered-row pixel data to which the parallel-serial conversion has been performed into a predetermined voltage level and output the predetermined voltage level to the external LSI.

Figure 19:
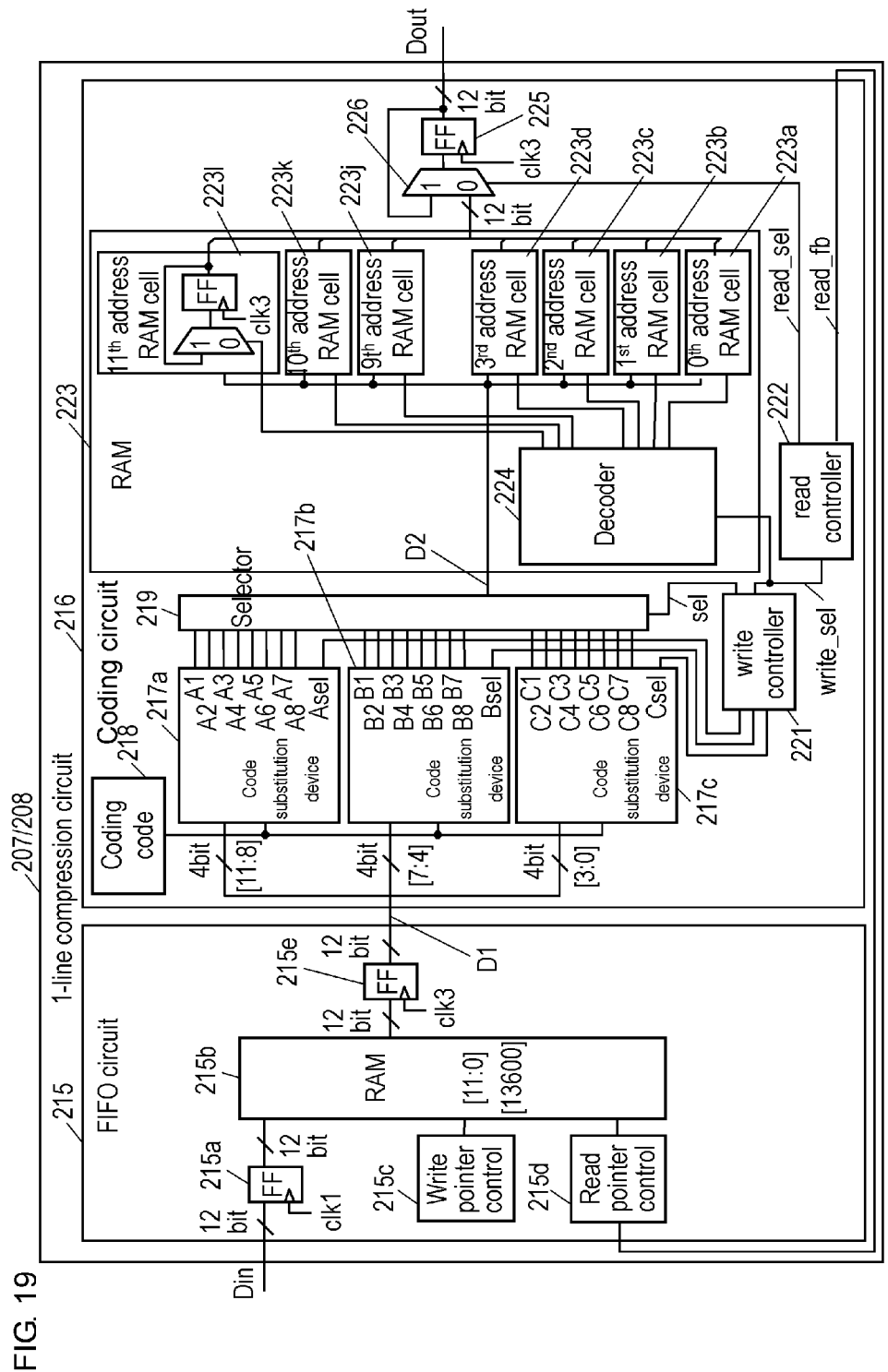
FIG. 19 is a block diagram illustrating a configuration example of a one-line compression circuit that performs variable length coding in the fifth exemplary embodiment.

Referring to FIG. 19, each of one-line compression circuits 207 and 208 includes FIFO circuit 215 and coding circuit 216. Clock signal clk3 is a clock that is driven 12 times as much as clock signal clk1, and the Flip-Flop and the circuit, in which the clock is not clearly indicated, are operated at clock signal clk1.

It is assumed that FIFO circuit 215 is operated by an asynchronous FIFO method in which the write operation and the read operation are performed to the RAM in an asynchronous manner, and it is assumed that the RAM used is constructed by about 1361 words (the memory in which the pieces of pixel data of ⅓ of the pixels constituting one row) of 12 bits.

An operation of the solid-state image capturing device of the fifth exemplary embodiment having the above configuration will be described below.

The overlapping description is omitted for pixel array 101, column ADC circuits 103 and 104, column digital memories 105 and 106, PS conversion circuits 111 and 112, and differential output circuits 113 and 114, which have the same circuit configurations as those of the third exemplary embodiment.

In the fifth exemplary embodiment, when row scanning circuit 102 performs the read scanning to an arbitrary xth row, pixel array 101, column ADC circuit 103, and column digital memory 105 perform the same operations as the third exemplary embodiment, and the pixel data indicated by signal Ain of FIG. 6 is input to one-line compression circuit 207.

FIG. 19 is a block diagram illustrating a configuration example of one-line compression circuit 207. Referring to FIG. 19, one-line compression circuit 207 includes FIFO circuit 215 and coding circuit 216. FIFO circuit 215 includes FF 215a (12-bit latch circuit), RAM 215b, write pointer control 215c, read pointer control 215d, and FF 215e (12-bit latch circuit). Coding circuit 216 includes code substitution device 217a, code substitution device 217b, code substitution device 217c, coded code 218, selector 219 write controller 221, read controller 222, RAM 223 (12 RAM cells 223a to 223l and decoder 224), FF 225 (12-bit latch circuit), and selector 226.

The pixel data input as input signal Ain to one-line compression circuit 207 is written in the RAM of FIFO circuit 215 of FIG. 19 by the FIFO method. When output signal read_fb of coding circuit 216 becomes high, the read operation is performed to the pixel data, which is stored in the RAM of FIFO circuit 215, by the FIFO method, and the pixel data is output as output signal D1 to coding circuit 216.

The pixel data input as signal D1 to coding circuit 216 is divided in each 4 bits, and code substitution device 217a compares the 4 bits of the pixel data to a comparative signal illustrated in FIG. 21. The coded code of matched bit is output as a corresponding value from signals A1 to A8 of FIG. 21. Code substitution device 217a outputs signal Asel indicating the output bit to write controller 221.

Code substitution devices 217b and 217c are operated similarly to code substitution device 217a.

Write controller 221 recognizes the bit widths of signals A1 to A8 that are actually output from code substitution device 217a using signal Asel, and outputs selection signal sel to selector 219 such that the coded code is sequentially output from the higher bit to selector 219. At the same time, write controller 221 outputs output signal write_sel specifying a write address pointer to RAM 223 in order to write the coded code output one by one from selector 219 in RAM 223. Output signal write_sel is 4-bit data that specifies one of bit addresses 0 to 11. Output signal write_sel is decremented from 11 to 0 by 1 every time the write operation is performed to the RAM. When decremented to 0, output signal write_sel is reset to 11 in performing the next write operation to the RAM, and the same operation is repeated, thereby controlling the write operation to the RAM.

Selector 219 selects a signal corresponding to signal sel output from write controller 221, and outputs the selected signal as signal A2 to the RAM.

Figure 22:
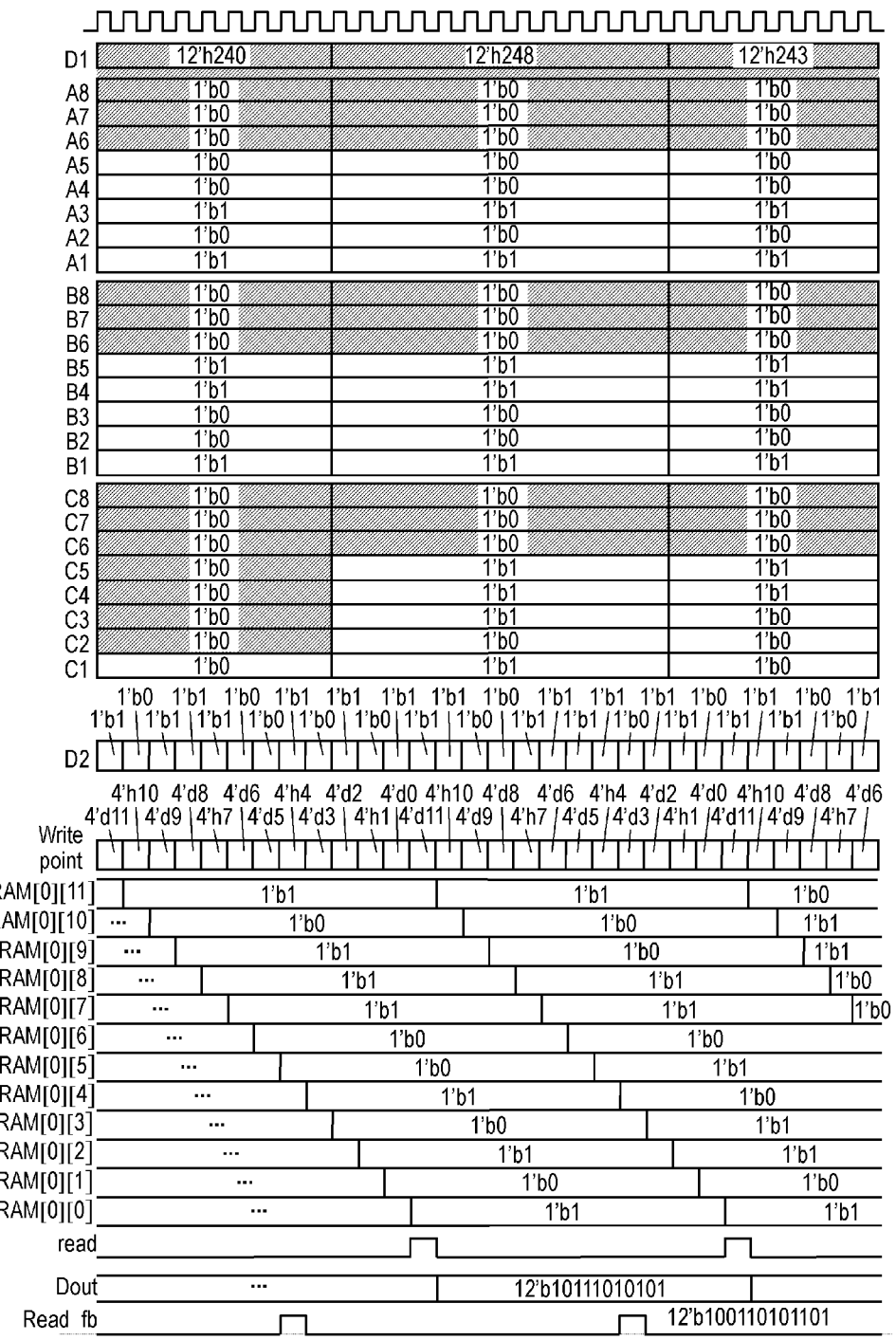
FIG. 22 is a view illustrating the operation of the one-line compression circuit and an example of output data in the fifth exemplary embodiment.

As illustrated in FIG. 22, in RAM 223, a 0th address to an 11th address of the 1-bit memories correspond to values 0 to 11 of signal write_sel output from write controller 221, and the value of signal A2 output from the selector is written in the corresponding memory.

Read controller 222 generates signal read_sel immediately after signal write_sel becomes 0, outputs the 12-bit data stored in the addresses 11 to 0 of RAM 223. After the 12-bit data is synchronized with an output clock (not illustrated) by an FF, the 12-bit data is output as Dout.

Figure 20:
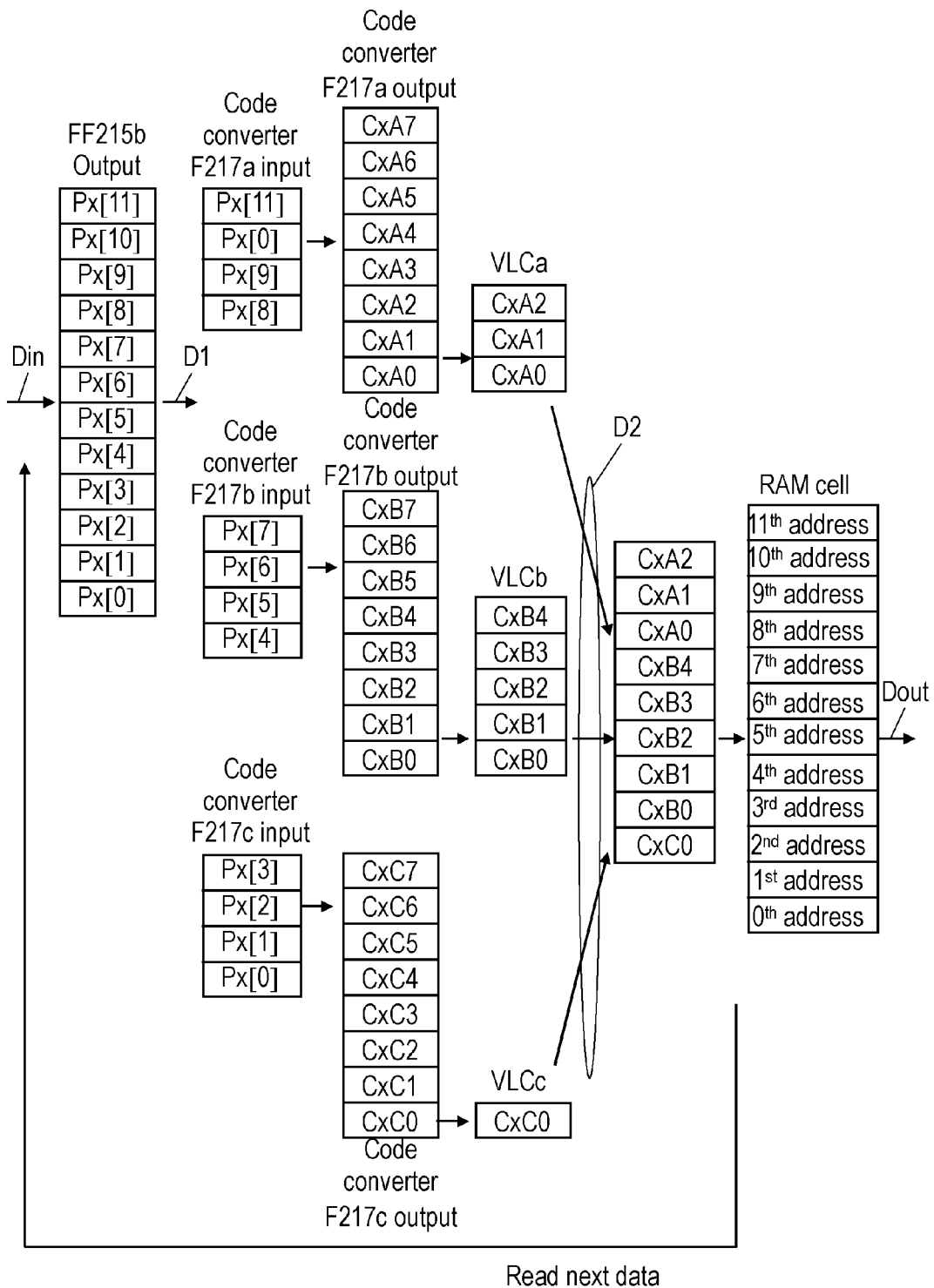
FIG. 20 is an explanatory view illustrating an operation of the one-line compression circuit that performs the variable length coding in the fifth exemplary embodiment.

As described above, FIFO circuit 215, code substitution devices 217a, 217b, and 217c, selector 219, write controller 221, RAM 223, and read controller 222 are operated to code each 4 bit of the 12-bit pixel data input from signal D1 in the code of FIG. 21 as shown in FIG. 20, and the pixel data can be output in each 12 bit from output signal Dout of coding circuit 216.

The coded pixel data output from coding circuit 216 is output to PS conversion circuit 111, and output to the external LSI through differential output circuit 113.

The same processing as the even-numbered-row image data is performed to odd-numbered-row image data by the same circuit as the even-numbered-row image data, and the differential signal is output to the external LSI.

As described above, according to the fifth exemplary embodiment, the pixel data having the high appearance frequency is substituted with the code having the small number of bits, which allows the pixel data to be compressed and reduced. Additionally, because of the reversible compression method, the data can completely be restored during the decoding, and the degradation by the compression is eliminated.

The memory necessary for the one-line compression (the memory used for the compression processing in each of one-line compression circuits 207 and 208) includes the register corresponding to the pieces of pixel data of about 3 pixels, the register of several bits necessary for the FIFO processing and the like, and the RAM (the memory in which the pieces of pixel data of ⅔ of pixels constituting one row) used in each of FIFO circuits 215 and 216.

According to the fifth exemplary embodiment, the pixel data output from the solid-state image capturing device can reversibly be compressed while the expansion of the memory is suppressed to one line or less.

Sixth Exemplary Embodiment

In a sixth exemplary embodiment, an image capturing apparatus (camera system) that includes solid-state image capturing device 1001 including a one-line compression circuit and image signal processing unit (in this case, image processing LSI) 2003 including a decoding circuit will be described with reference to FIG. 23.

Figure 23:
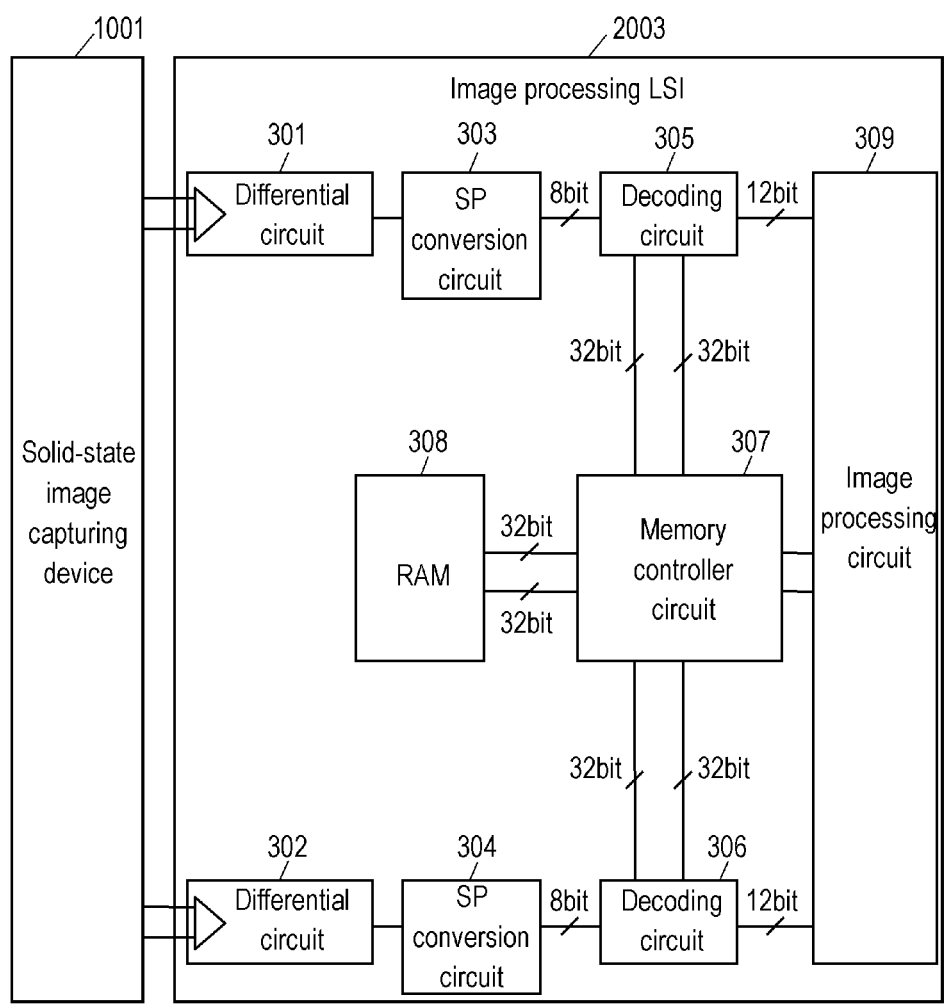
FIG. 23 is a configuration diagram of a camera system according to a sixth exemplary embodiment.

FIG. 23 is a configuration diagram of the camera system of the sixth exemplary embodiment. Each component will be described below. Although the image capturing apparatus includes optical system 600 of FIGS. 1 and 2, optical system 600 is omitted in FIG. 23.

Optical system 600 includes lens 601 that collects the light from the subject to form the image on an image capturing surface of solid-state image capturing device 1001 and mechanical shutter 602 that mechanically controls image capturing timing and a shutter speed of the camera system. In the sixth exemplary embodiment configured as illustrated in FIG. 23, solid-state image capturing device 1001 is the fourth exemplary embodiment. It is assumed that solid-state image capturing device 1001 of FIG. 23 has the configuration of the third exemplary embodiment.

Image processing LSI 2003 includes differential input circuit 301 that converts a differential signal of the even-numbered-row coded pixel data output from solid-state image capturing device 1001 into the digital serial data; differential input circuit 302 that converts a differential signal of the odd-numbered-row coded pixel data output from solid-state image capturing device 1001 into the digital serial data; SP conversion circuit 303 that converts the even-numbered-row coded pixel data, which has been converted into the serial data, into the 12-bit parallel data; SP conversion circuit 304 that converts the odd-numbered-row coded pixel data, which has been converted into the serial data, into the 12-bit parallel data; decoding circuit 305 that decodes the even-numbered-row coded pixel data which has been converted into the parallel data; decoding circuit 306 that decodes the odd-numbered-row coded pixel data which has been converted into the parallel data; memory controller circuit 307 that adjusts and manages the write of the pixel data in the RAM and the read of the pixel data from the RAM; RAM 308 that is operated by a write access and a read access from the memory controller; and image processing circuit 309 that performs the image processing to the decoded pixel data.

An operation of the camera system will be described below.

In the sixth exemplary embodiment, the operation of solid-state image capturing device 1001 is identical to that of the fourth exemplary embodiment in the operation until the pixel signal is output by differential output circuit since the photoelectric conversion is performed to the light quantity incident to each pixel of pixel array 101. When solid-state image capturing device 1001 transmits the even-numbered-row coded pixel data as the voltage signal, differential input circuit 301 converts a predetermined differential signal into a serial signal, and outputs the serial signal to SP conversion circuit 303.

Figure 25:
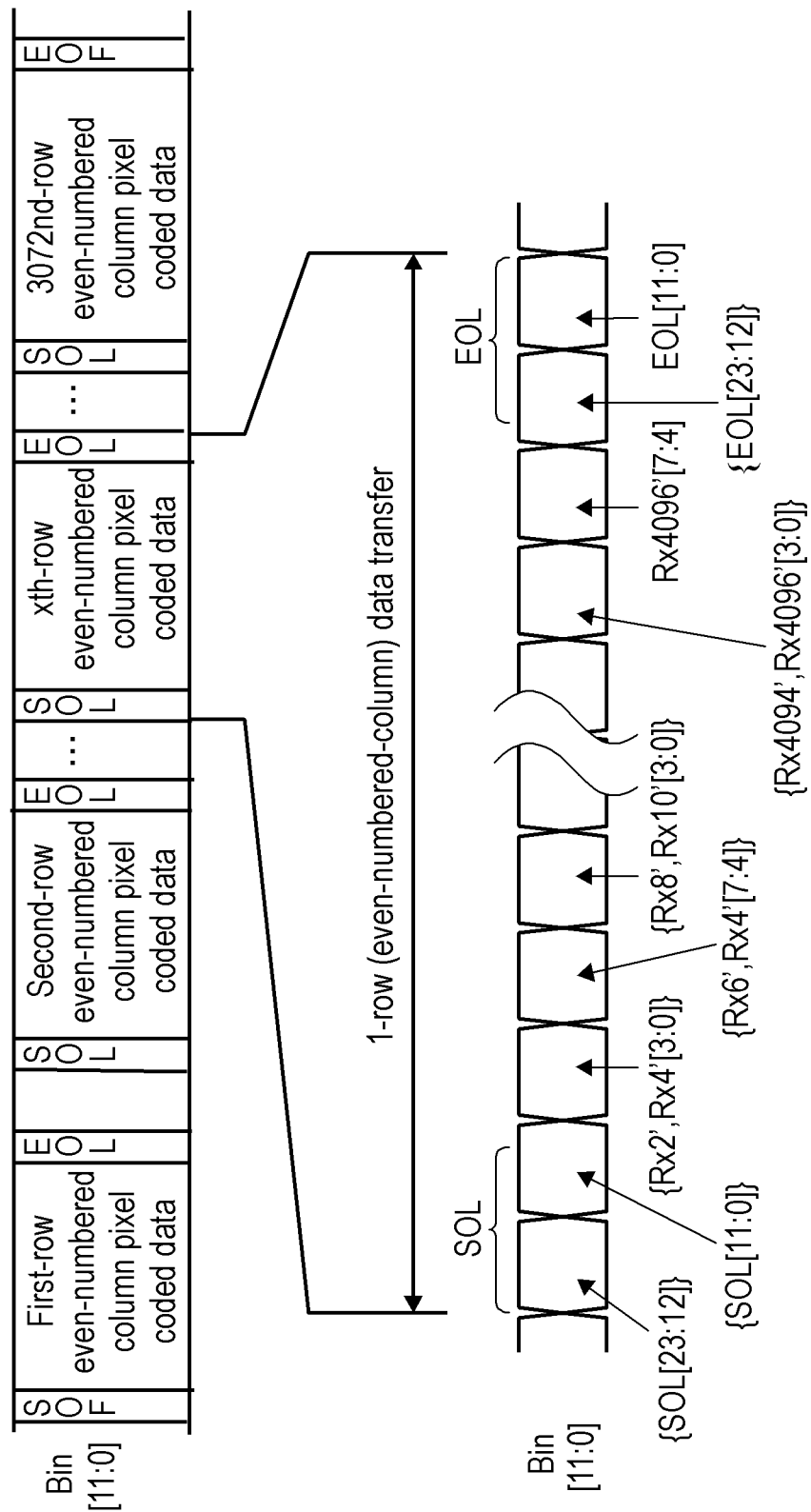
FIG. 25 is a view illustrating an example of an input data string in the sixth exemplary embodiment.

SP conversion circuit 303 converts the even-numbered-row coded pixel data, which has been converted into the serial data, from the serial data into the 12-bit parallel data, and outputs the 12-bit parallel data to decoding circuit 305 as indicated by signal Bin in FIG. 25.

Figure 24:
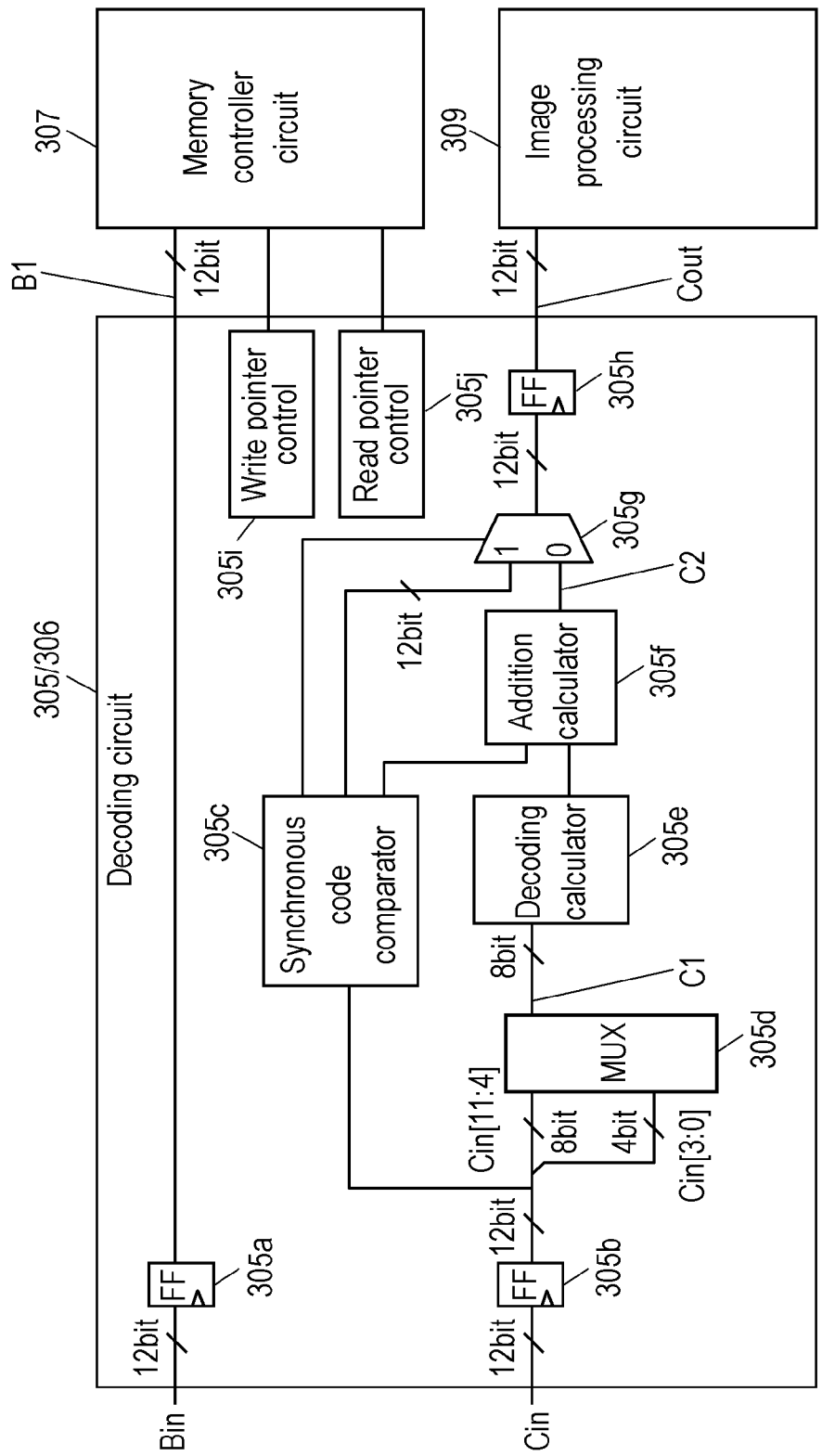
FIG. 24 is a block diagram illustrating a configuration example of a decoding circuit in the sixth exemplary embodiment.
Figure 26:
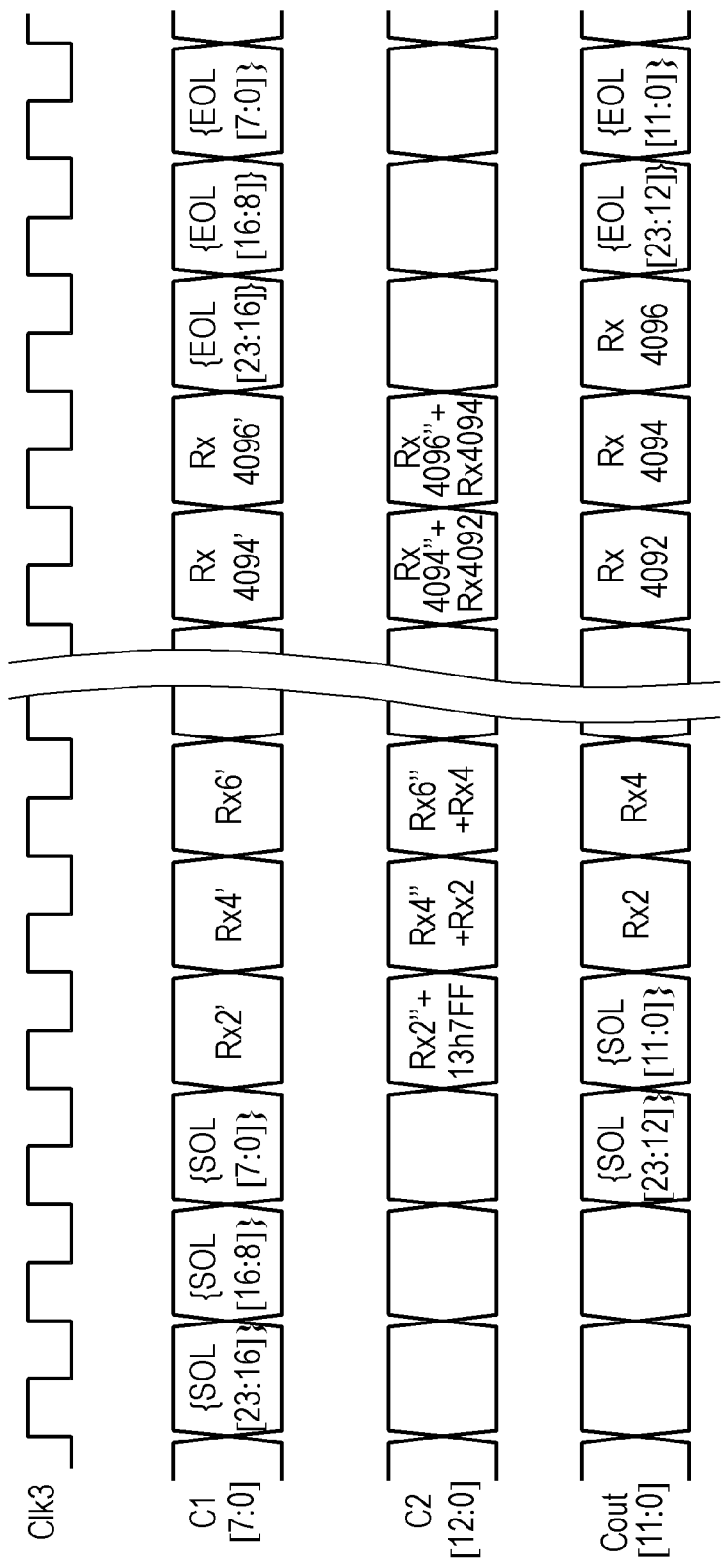
FIG. 26 is a timing chart illustrating an operation of the decoding circuit in the sixth exemplary embodiment.
Figure 27:
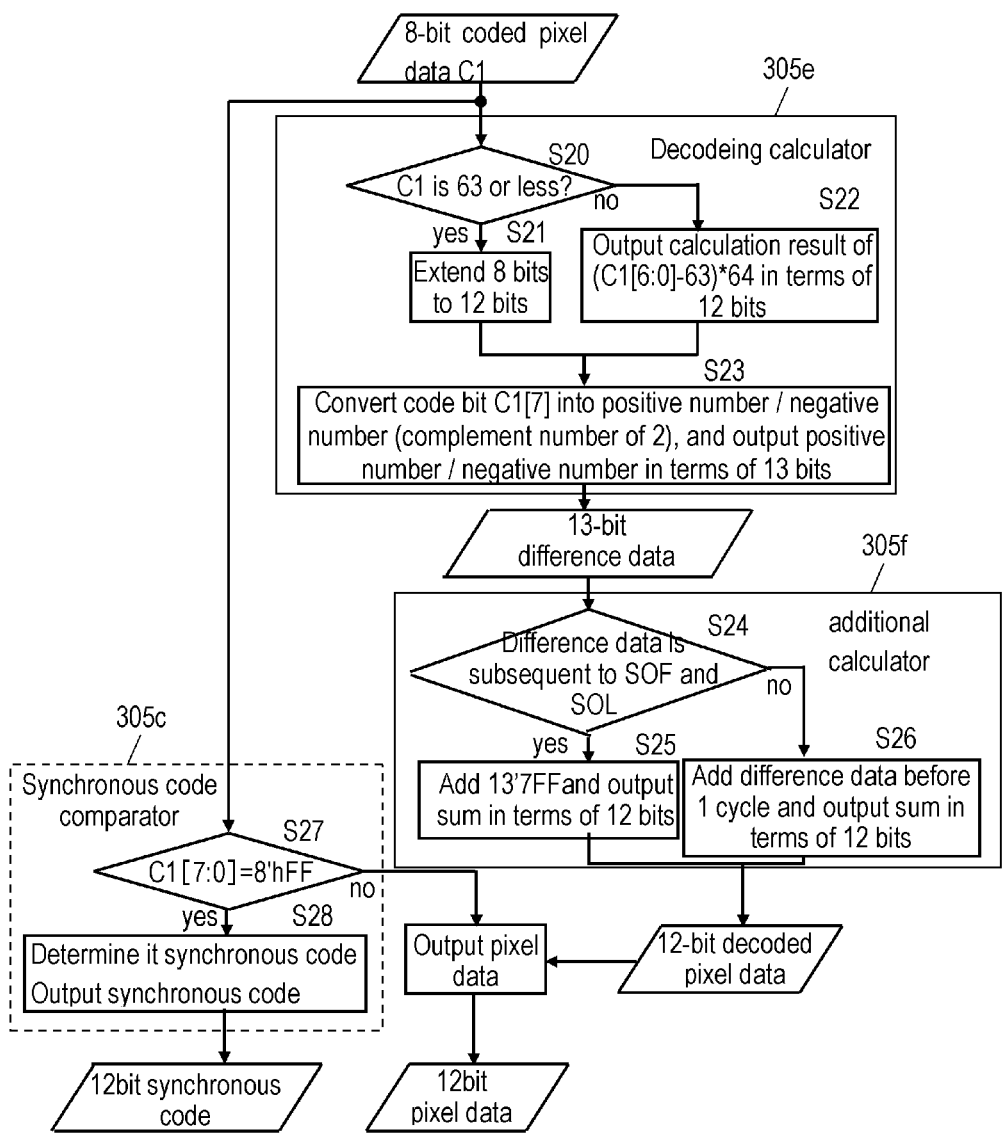
FIG. 27 is a flowchart illustrating the operation of the decoding circuit in the sixth exemplary embodiment.

Decoding circuit 305 outputs the even-numbered-row coded pixel data, which has been converted into the parallel data, to memory controller circuit 307 from output signal B1, thereby writing the even-numbered-row coded pixel data in RAM 308. Then, the read operation is performed to the RAM, the even-numbered-row coded pixel data is input to decoding circuit 305 from signal Cin of FIG. 24. The read 12-bit data is divided into two pieces of 8-bit even-numbered-row coded pixel data as indicated by signal C1 of FIG. 26. Decoding processing is performed to coded pixel data C1 along a flow-chart of FIG. 27. Decoding circuit 305 outputs the decoded 12-bit even-numbered-row pixel data to image processing circuit 309 from output signal Cout of FIG. 24. In FIG. 26, Rx2" to Rx4096" mean values in which Rx2' to Rx4096' are converted into 13-bit positive or negative numbers (complement number of 2).

The same processing as the even-numbered-row coded pixel data is performed to the odd-numbered-row coded pixel data by the same circuits, and the odd-numbered-row coded pixel data is output to the image processing circuit.

The control of the optical system, namely, automatic or manual focusing, drive of a zoom lens and the like, shutter control such as an iris and exposure timing control, and the like are not clearly illustrated in the drawings. However, the control of the optical system is directly performed from image processing LSI 2003, or indirectly performed from image processing through a driving IC. The description of the control of the optical system is omitted because the control of the optical system does not relate directly to the invention.

According to the sixth exemplary embodiment, because image processing LSI 2003 can receive and decode the pixel data to which the one-line compression has been performed by solid-state image capturing device 1001, the data transfer frequency can be suppressed on the image transmission path connecting solid-state image capturing device 1001 and image processing LSI 2003. As a result, the power consumption can be reduced in the circuit region that performs the high-speed transmission from solid-state image capturing device 1001 to image processing LSI 2003, and the generation of the electromagnetic noise can be prevented.

According to the sixth exemplary embodiment, in the decoding, the pixel data can be written in and read from the existing RAM installed in image processing LSI 2003 through the memory controller. Therefore, it is not necessary that the RAM be installed in the decoding circuit, and the expansion memory can be reduced.

Seventh Exemplary Embodiment

A solid-state image capturing device including a one-line compression circuit that can select the compression and non-compression will be described in a seventh exemplary embodiment.

Figure 28:
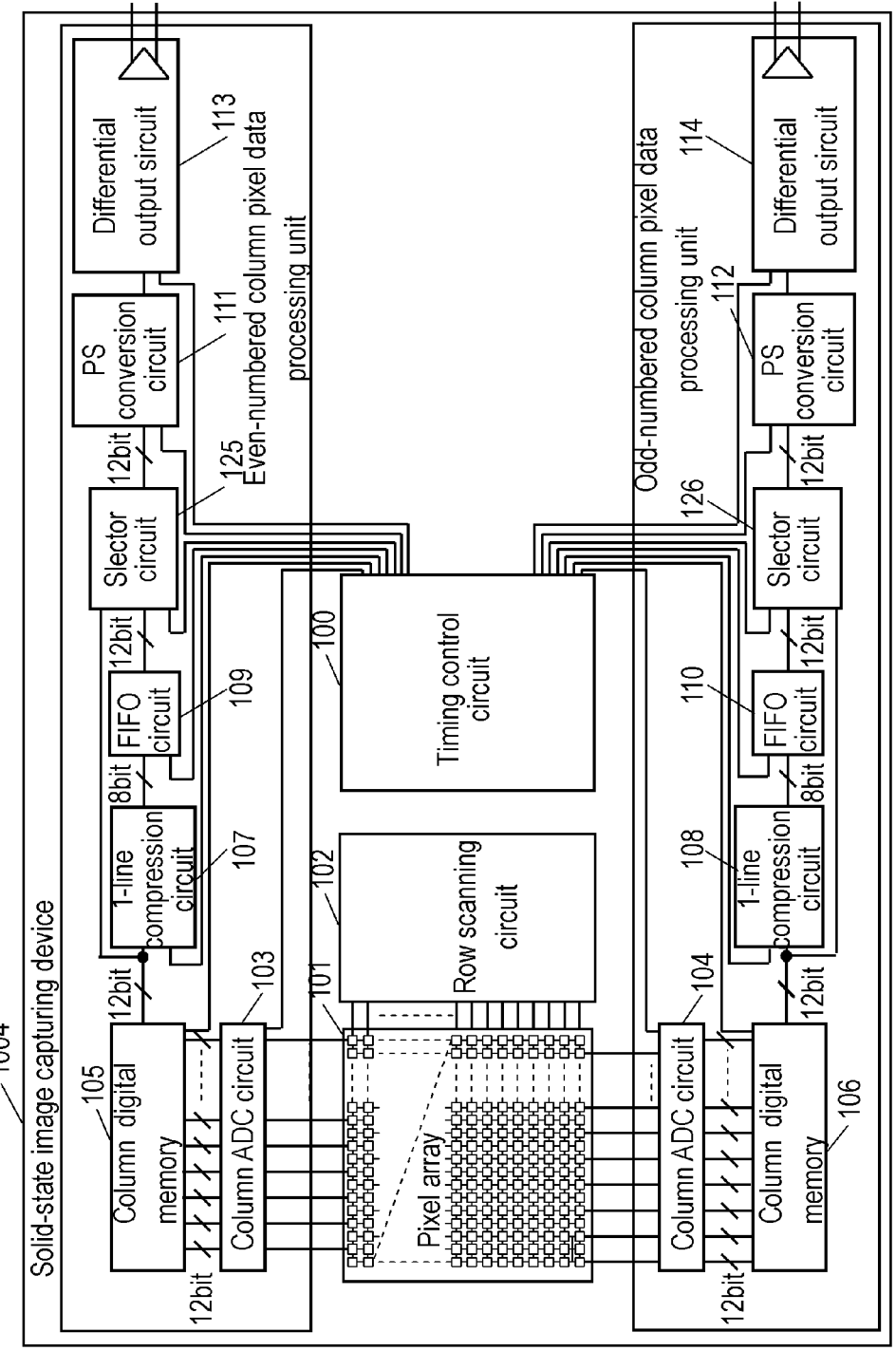
FIG. 28 is a block diagram illustrating a configuration example of a solid-state image capturing device according to a seventh exemplary embodiment.

FIG. 28 is a block diagram illustrating image capturing apparatus 1004 of the seventh exemplary embodiment.

Referring to FIG. 28, in addition to the configuration of the fourth exemplary embodiment, the solid-state image capturing device of the seventh exemplary embodiment includes selector circuit 125 that outputs one of the even-numbered-row pixel data output from column digital memory 105 and the even-numbered-row coded pixel data output from FIFO circuit 109 and a selector circuit 126 that outputs one of the odd-numbered-row pixel data output from column digital memory 106 and the odd-numbered-row coded pixel data output from FIFO circuit 110.

Figure 29:
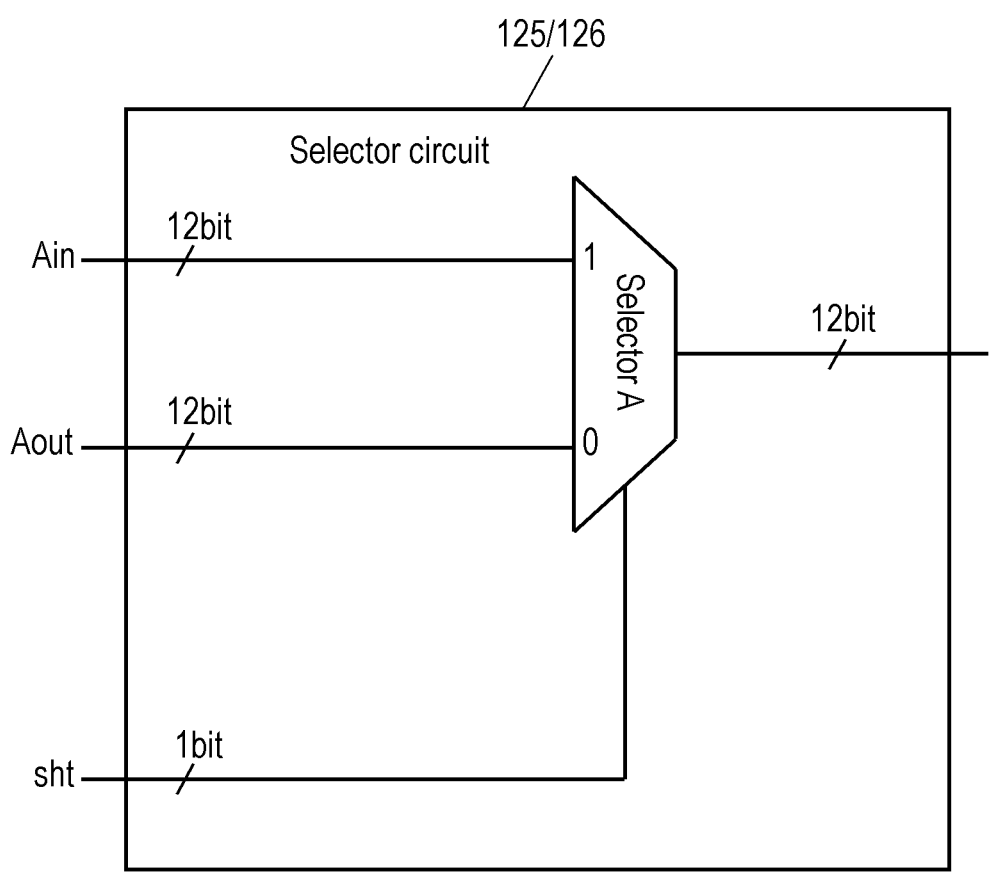
FIG. 29 is a block diagram illustrating an example of a selector circuit in the seventh exemplary embodiment.
Figure 30:
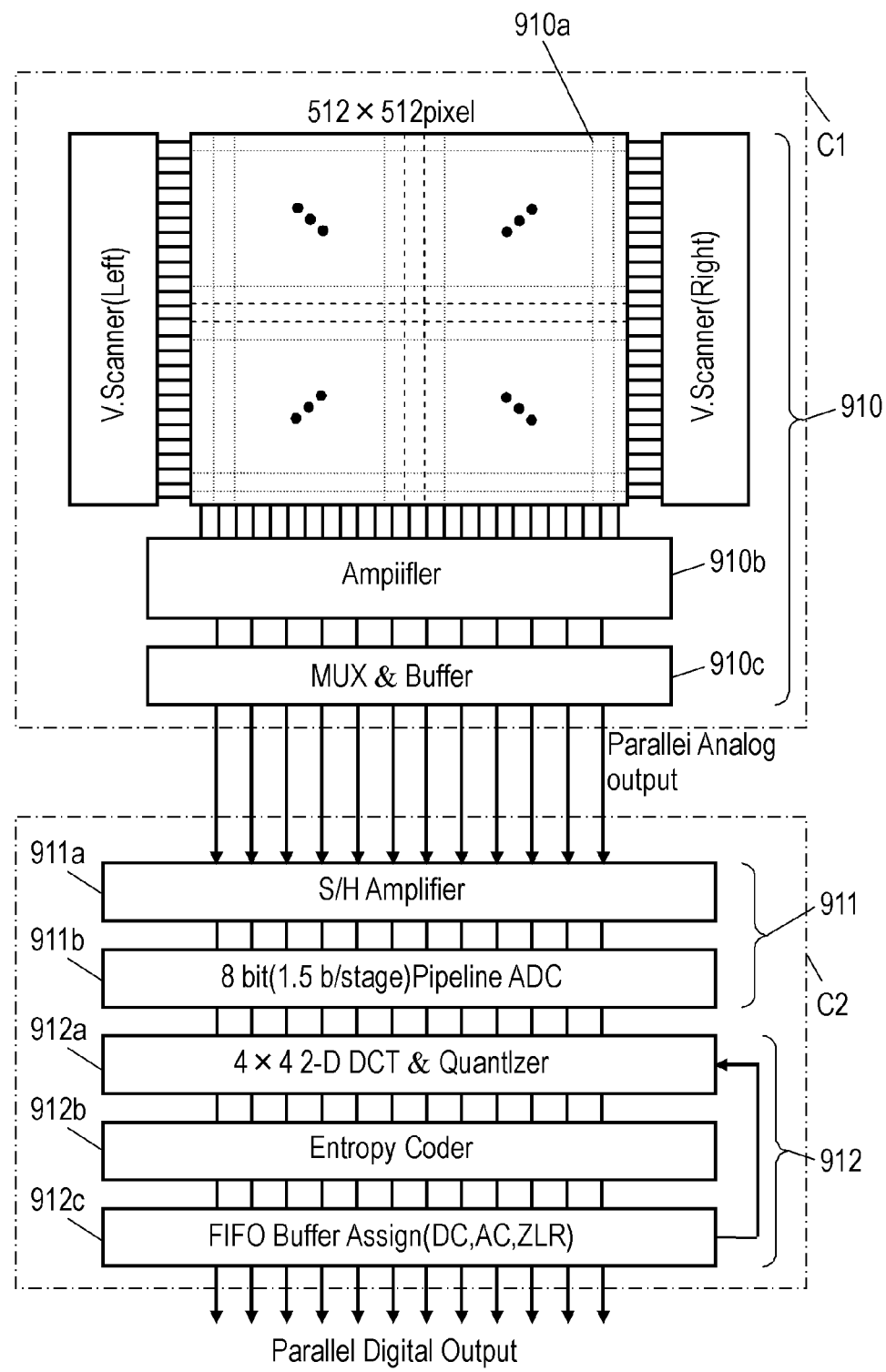
FIG. 30 is a block diagram illustrating a configuration of a solid-state image capturing device of the background art.

Each of selector circuit 125 and 126 of FIG. 28 is constructed as illustrated in FIG. 29.

An operation of the solid-state image capturing device of the seventh exemplary embodiment having the above configuration will be described below.

In the seventh exemplary embodiment, when signal sht output from timing control circuit 100 is in a state of 1'11, signal Ain is selected by selector A of selector circuit 125, and the even-numbered-row pixel data output from output signal Ain of column digital memory 105 is output from output signal S of selector circuit 125. When signal sht output from timing control circuit 100 is in a state of 1'b0, signal Aout is selected by selector A of selector circuit 125, and the even-numbered-row coded pixel data output from output signal Aout of FIFO circuit 109 is output from output signal S of selector circuit 125.

The even-numbered-row pixel data or the even-numbered-row coded pixel data, which is output from selector circuit 125, is output to the external LSI through PS conversion circuit 211 and differential output circuit 113. Selector circuit 126 performs the same operation.

According to the seventh exemplary embodiment, the compression and the non-compression of the pixel data output from the solid-state image capturing device can be selected. Therefore, in the camera system to which solid-state image capturing device 1004 is applied, for example, the compressed image is output from solid-state image capturing device and displayed on a liquid crystal screen in a preview mode until a release button of the camera is pressed. After the release button is pressed, the solid-state image capturing device transitions to a still mode (still image mode) to perform mode switching such as the exposure time and the pixel access, and the selector circuit is switched before the initial image is output since the mode transition, which allows the non-compressed image to be output from solid-state image capturing device 1004. As a result, advantageously the power consumption can be reduced in preview that occupies a large portion of a use time of the image capturing apparatus while the non-compressed, high-quality image can be acquired in the still image mode.

In the configuration of the seventh exemplary embodiment, when the camera is set to a continuous image capturing mode, because a frame rate is set higher as much as possible, the compressed image can be output from solid-state image capturing device 1004. As a result, the number of continuous captured images per second can be enhanced in the continuous image capturing mode.

In the case that the pixel data is set to non-compression output in selector circuits 125 and 126, the increase in power consumption by the compression circuit can be reduced by stopping the clock to one-line compression circuits 107 and 108 and FIFO circuits 109 and 110.

In the solid-state image capturing device of the invention, because the transfer data amount can be compressed and reduced by the one-line compression, the data transfer time can be shortened, the operating frequency can be reduced, and therefore the reduction of the power consumption and the suppression of the electromagnetic noise can be achieved. Accordingly, the solid-state image capturing device of the invention is suitable for the camera that performs the high-speed image capturing.

What is claimed is:

1. A solid-state image capturing device comprising:
   an image capturing region including a plurality pixels in a two-dimensional array;
   a row scanning unit that performs row scanning to sequentially select a row from the two dimensional array;
   an A/D conversion unit that simultaneously converts analog pixel signals output from the plurality of pixels belonging to the selected row into pieces of digital pixel data;
   a row memory that stores pixel data of one row, to which the A/D conversion has been performed, therein; and
   a compression unit that sequentially performs compression coding to pixel data output from the row memory, wherein,
   when performing the compression coding to the pixel data, the compression unit refers to pixel data belonging to a respective row for which compression coding performed while not referring to pixel data belonging to a row different from the respective row the row memory includes:

a first memory that stores pixel data corresponding to an even-numbered column; and a second memory that stores pixel data corresponding to an odd-numbered column, and the compression unit includes:

a first compression unit that sequentially performs compression coding of the pixel data output from the first memory by referring to the pixel data stored in the first memory; and a second compression unit that sequentially performs compression coding of the pixel data output from the second memory by referring to the pixel data stored in the second memory.

2. The solid-state image capturing device according to claim 1, further comprising:

a FIFO (First In First Out) unit that stores coded pixel data from the compression unit therein by a FIFO method and intermittently outputs the coded pixel data, wherein the FIFO unit inputs the coded pixel data of one row from the compression unit during a first cycle in a row selection cycle in which the row scanning unit selects one row, and outputs coded pixel data corresponding to the one row at a constant bit rate during a second cycle shorter than the first cycle.

3. The solid-state image capturing device according to claim 2, wherein the compression unit codes N-bit (N is an integer of 2 or more) pixel data into n-bit (n is an integer of n<N) coded pixel data, and the FIFO unit forms an N-bit data string by decomposing and coupling a stored coded pixel data string, and sequentially outputs N-bit data of one row during the second cycle.

4. The solid-state image capturing device according to claim 1, wherein the compression unit uses another pieces of pixel data in the identical row as a reference pixel, and calculates pixel data using an s-order expression (s is a natural number) to code the pixel data into coded pixel data having a fixed length.

5. The solid-state image capturing device according to claim 1, wherein the compression unit performs variable length coding by substituting a variable length code for the pixel data.

6. The solid-state image capturing device according to claim 1, wherein the compression unit divides pixel data of the row memory into a plurality of pieces of partial data to perform variable length coding to each piece of partial data.

7. The solid-state image capturing device according to claim 1, further comprising a selector unit that selects which compressed pixel data or non-compressed pixel data is output.

8. The solid-state image capturing device according to claim 1, further comprising:

a first FIFO (First In First Out) unit that stores coded pixel data from the first compression unit therein by a FIFO method and intermittently outputs the coded pixel data; and a second FIFO (First In First Out) unit that stores coded pixel data from the second compression unit therein by the FIFO method and intermittently outputs the coded pixel data, wherein each of the first FIFO unit and the second FIFO unit inputs the coded pixel data of a half of a row from the compression unit during a first cycle in a row selection cycle in which the row scanning unit selects one row, and outputs coded pixel data corresponding to the half of the row at a constant bit rate from each of the first FIFO unit and the second FIFO unit during a second cycle shorter than the first cycle.

9. The solid-state image capturing device according to claim 8, wherein each of the first compression unit and the second compression unit codes N-bit (N is an integer of 2 or more) pixel data into n-bit (n is an integer of n<N) coded pixel data, and each of the first FIFO unit and the second FIFO unit forms an N-bit data string by decomposing and coupling a stored coded pixel data string, and sequentially outputs N-bit data of one row during the second cycle.

10. An image capturing apparatus comprising:

the solid-state image capturing device as claim 1; and an image processing LSI including a decoding unit that decodes the compressed pixel data output from the solid-state image capturing device.

11. The image capturing apparatus according to claim 10, wherein the selector unit selects the compressed pixel data in a preview mode and selects the non-compressed pixel data in a still image mode.

12. The image capturing apparatus according to claim 10, wherein the selector unit selects the non-compressed pixel data in a still image mode and selects the compressed pixel data in a continuous image capturing mode.

* * * * *